(12) United States Patent
Cannon et al.

(10) Patent No.: US 8,688,149 B2
(45) Date of Patent: *Apr. 1, 2014

(54) CORDLESS TELEPHONE ACTIVE-CALL ENABLED INTERCOM

(71) Applicant: Agere Systems LLC, Allentown, PA (US)

(72) Inventors: Joseph M. Cannon, Harleysville, PA (US); James A. Johanson, Schwenksville, PA (US)

(73) Assignee: Agere Systems LLC, Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/792,593

(22) Filed: Mar. 11, 2013

(65) Prior Publication Data

US 2013/0203396 A1    Aug. 8, 2013

Related U.S. Application Data

(60) Division of application No. 13/367,957, filed on Feb. 7, 2012, now Pat. No. 8,423,055, which is a continuation of application No. 09/777,889, filed on Feb. 7, 2001, now Pat. No. 8,131,308.

(51) Int. Cl.
*H04W 4/00* (2009.01)

(52) U.S. Cl.
USPC ........ 455/462; 455/550.1; 455/561; 455/420; 455/416; 455/464; 379/215.01; 379/201.01; 379/202.01; 379/205.01; 379/204.01

(58) Field of Classification Search
USPC .............. 455/462, 550.1, 561, 420, 416, 464, 455/465, 515, 463, 95, 149, 74.1, 426, 567, 455/569.1; 379/215.01, 201.01, 202.01, 379/205.01, 204.01, 433.01, 167.01, 379/167.04, 388.02

See application file for complete search history.

(56) References Cited

U.S. PATENT DOCUMENTS

| | | | |
|---|---|---|---|
| 4,588,861 A * | 5/1986 | Teich | 379/159 |
| 4,640,987 A | 2/1987 | Tsukada et al. | |
| 4,650,931 A | 3/1987 | Tsukada et al. | |
| 4,731,814 A | 3/1988 | Becker et al. | |
| 4,882,746 A | 11/1989 | Shimada | |
| 4,897,864 A * | 1/1990 | Murata et al. | 455/463 |
| 4,962,524 A | 10/1990 | Murata et al. | |
| 5,014,295 A | 5/1991 | Kunihiro | |
| 5,140,628 A | 8/1992 | Murata et al. | |
| 5,462,659 A | 10/1995 | Saxena et al. | |
| 5,926,766 A | 7/1999 | Yamagata et al. | |

(Continued)

OTHER PUBLICATIONS

Non-Final Office Action; Mailed Oct. 24, 2003 for corresponding U.S. Appl. No. 09/777,889.

(Continued)

*Primary Examiner* — Khai M Nguyen
(74) *Attorney, Agent, or Firm* — Mendelsohn, Drucker & Dunleavy, P.C.; Kevin M. Drucker; Steven Mendelsohn

(57) ABSTRACT

A method of using an intercom on a cordless telephone during an active call. The active call is put on hold while the intercom is in use. Once the call is re-activated, the intercom is shut off. This system may be designed for a cordless telephone with one handset or a plurality of handsets.

6 Claims, 20 Drawing Sheets

(56) References Cited

U.S. PATENT DOCUMENTS

| | | | |
|---|---|---|---|
| 6,029,071 A * | 2/2000 | Bertocci et al. | 455/463 |
| 6,128,504 A | 10/2000 | Ciccone | |
| 6,349,213 B1 | 2/2002 | Iyengar et al. | |
| 6,405,027 B1 * | 6/2002 | Bell | 455/403 |
| 6,628,768 B1 | 9/2003 | Ramaswamy et al. | |
| 7,231,207 B1 | 6/2007 | Cannon et al. | |
| 2007/0149188 A1 | 6/2007 | Miyashita et al. | |
| 2008/0012825 A1 * | 1/2008 | Robertson et al. | 345/156 |

OTHER PUBLICATIONS

Non-Final Office Action; Mailed Apr. 15, 2004 for corresponding U.S. Appl. No. 09/777,889.

Non-Final Office Action; Mailed Dec. 16, 2004 for corresponding U.S. Appl. No. 09/777,889.

Non-Final Office Action; Mailed Jun. 30, 2005 for corresponding U.S. Appl. No. 09/777,889.

Final Office Action; Mailed Mar. 9, 2006 for corresponding U.S. Appl. No. 09/777,889.

Advisory Action; Mailed Jun. 6, 2006 for corresponding U.S. Appl. No. 09/777,889.

Non-Final Office Action; Mailed Apr. 26, 2010 for corresponding U.S. Appl. No. 09/777,889.

Non-Final Office Action; Mailed Oct. 4, 2010 for corresponding U.S. Appl. No. 09/777,889.

Non-Final Office Action; Mailed Mar. 10, 2011 for corresponding U.S. Appl. No. 09/777,889.

Final Office Action; Mailed Aug. 30, 2011 for corresponding U.S. Appl. No. 09/777,889.

Notice of Allowance; Mailed Nov. 3, 2011 for corresponding U.S. Appl. No. 09/777,889.

Restriction Requirement; Mailed May 4, 2012 for corresponding U.S. Appl. No. 13/367,957.

Non-Final Office Action; Mailed Jun. 18, 2012 for corresponding U.S. Appl. No. 13/367,957.

Notice of Allowance; Mailed Dec. 12, 2012 for corresponding U.S. Appl. No. 13/367,957.

* cited by examiner

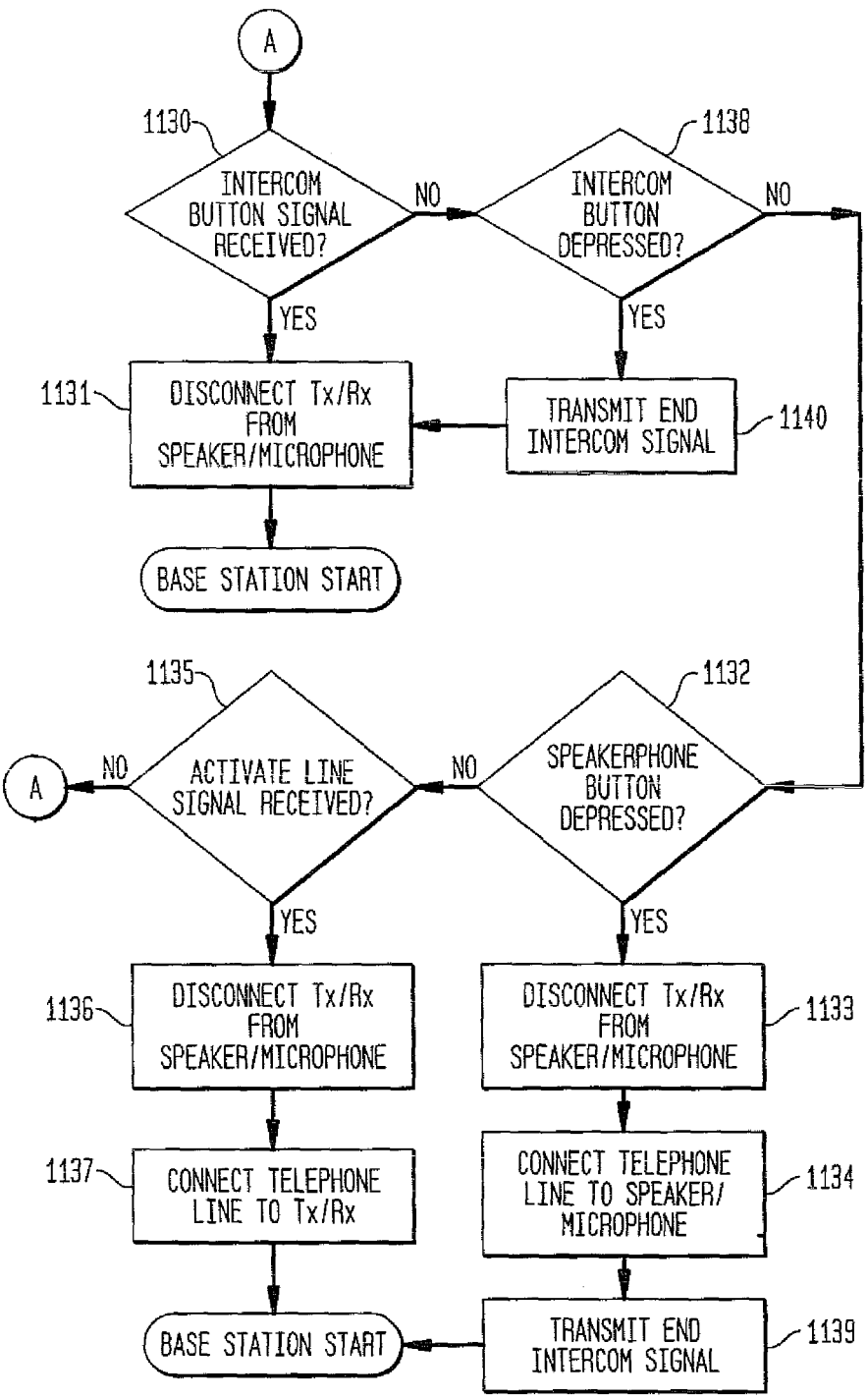

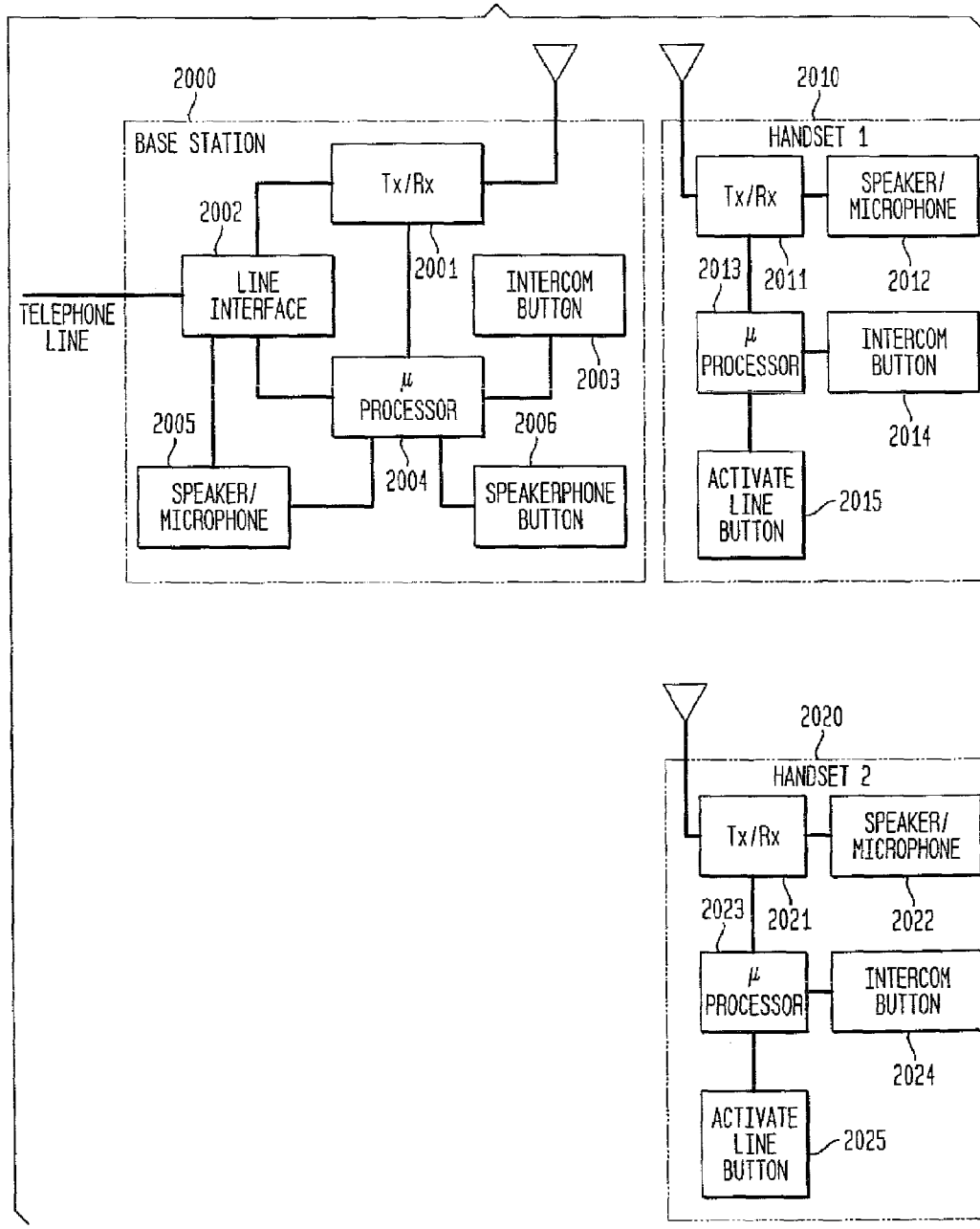

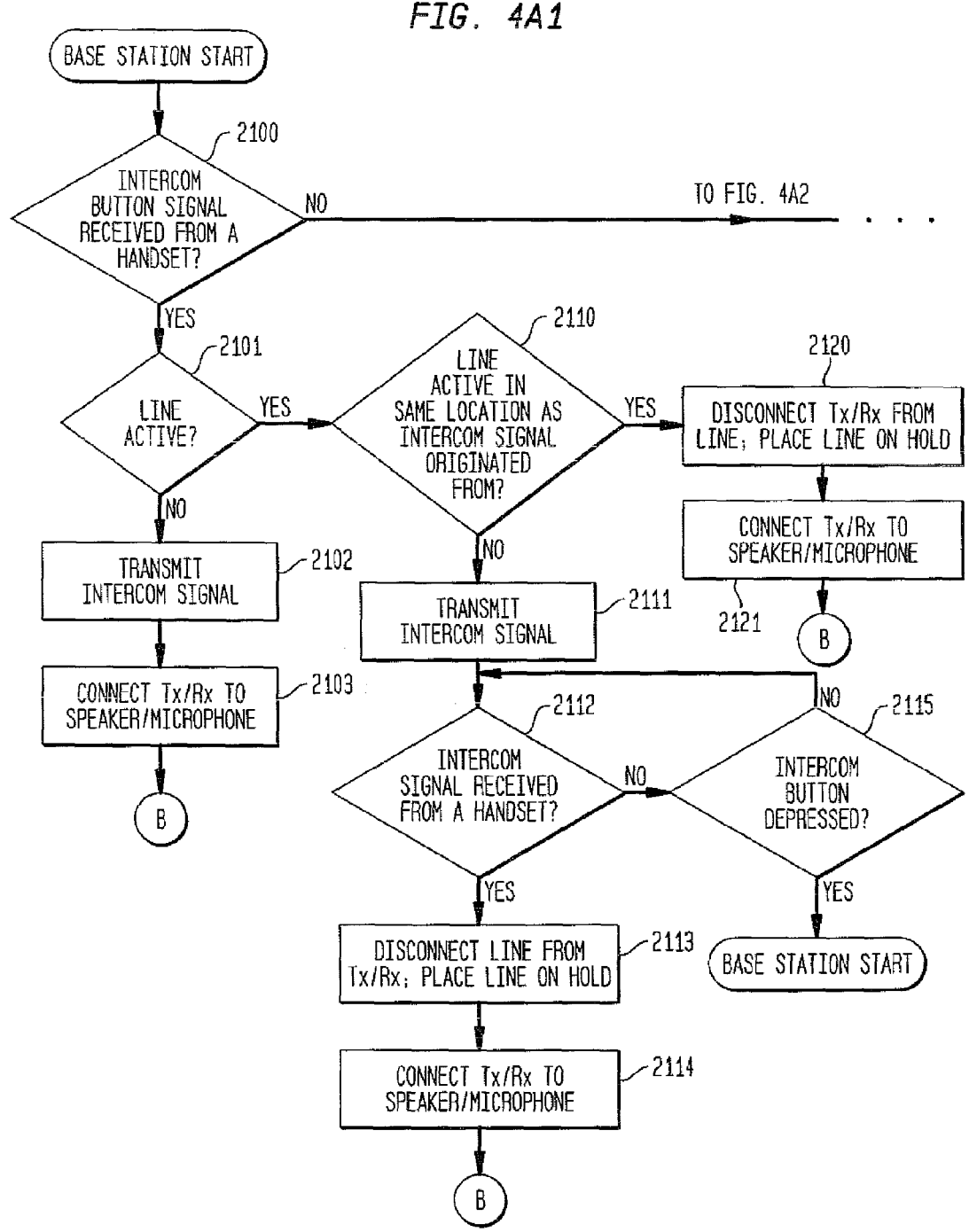
FIG. 4A1

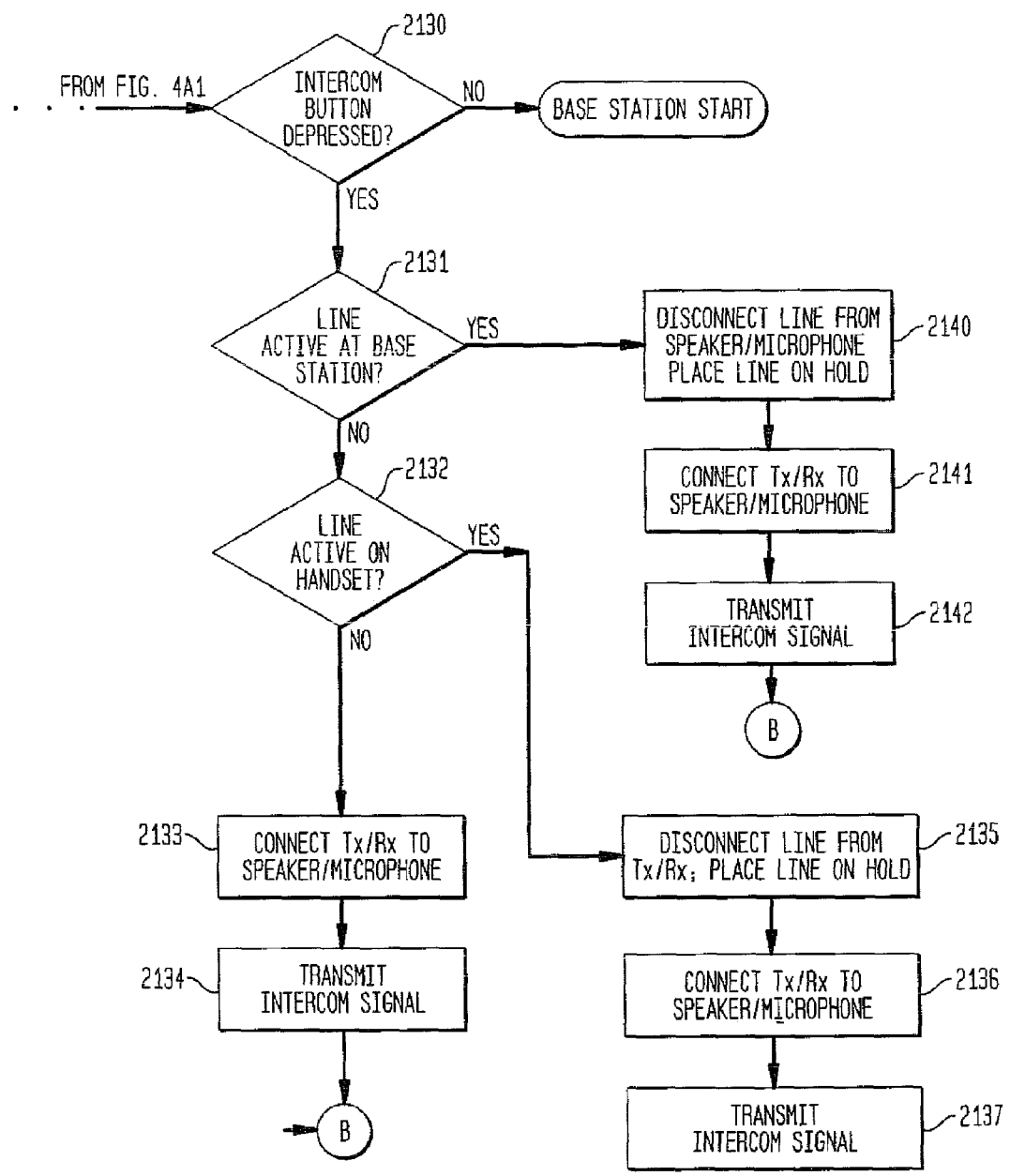

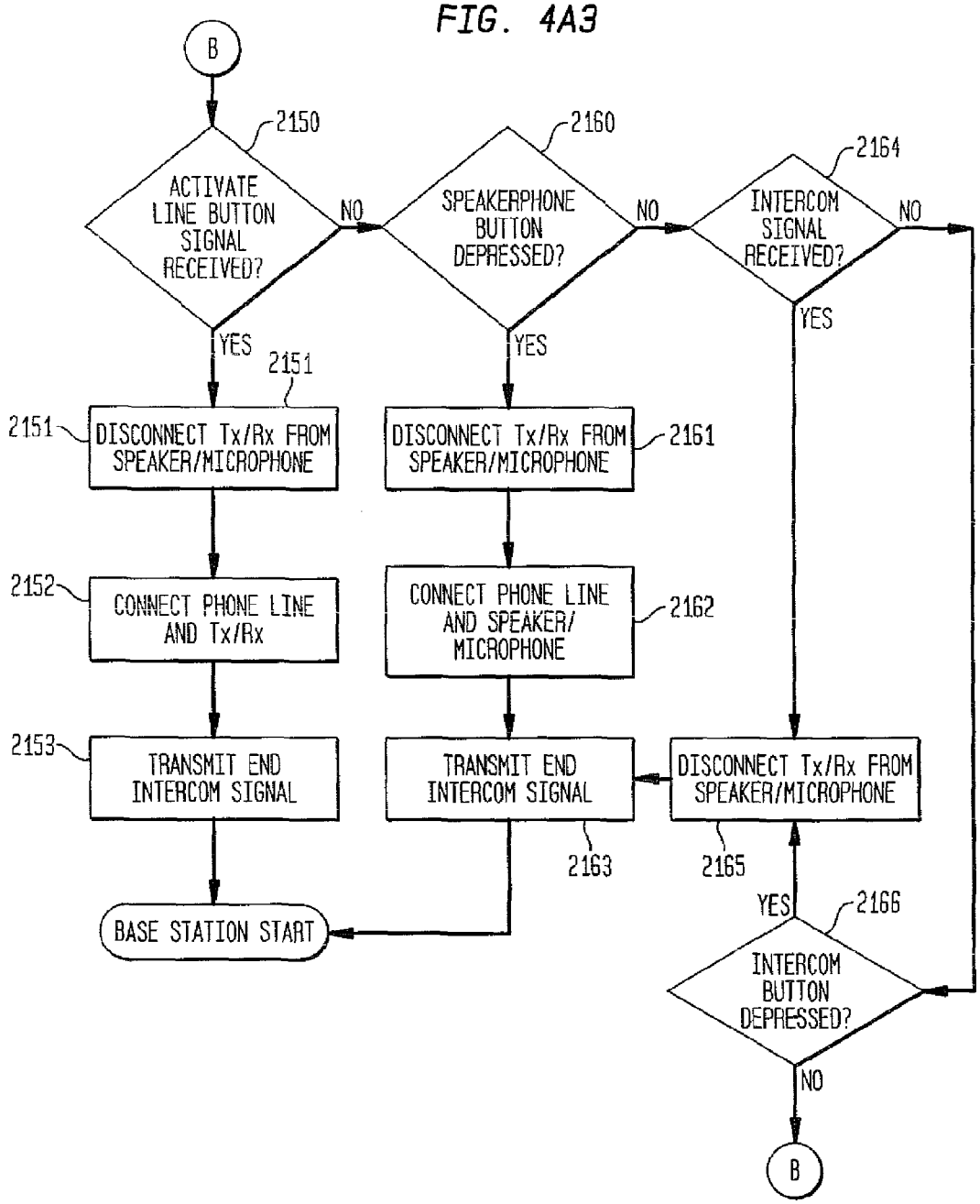
FIG. 4A3

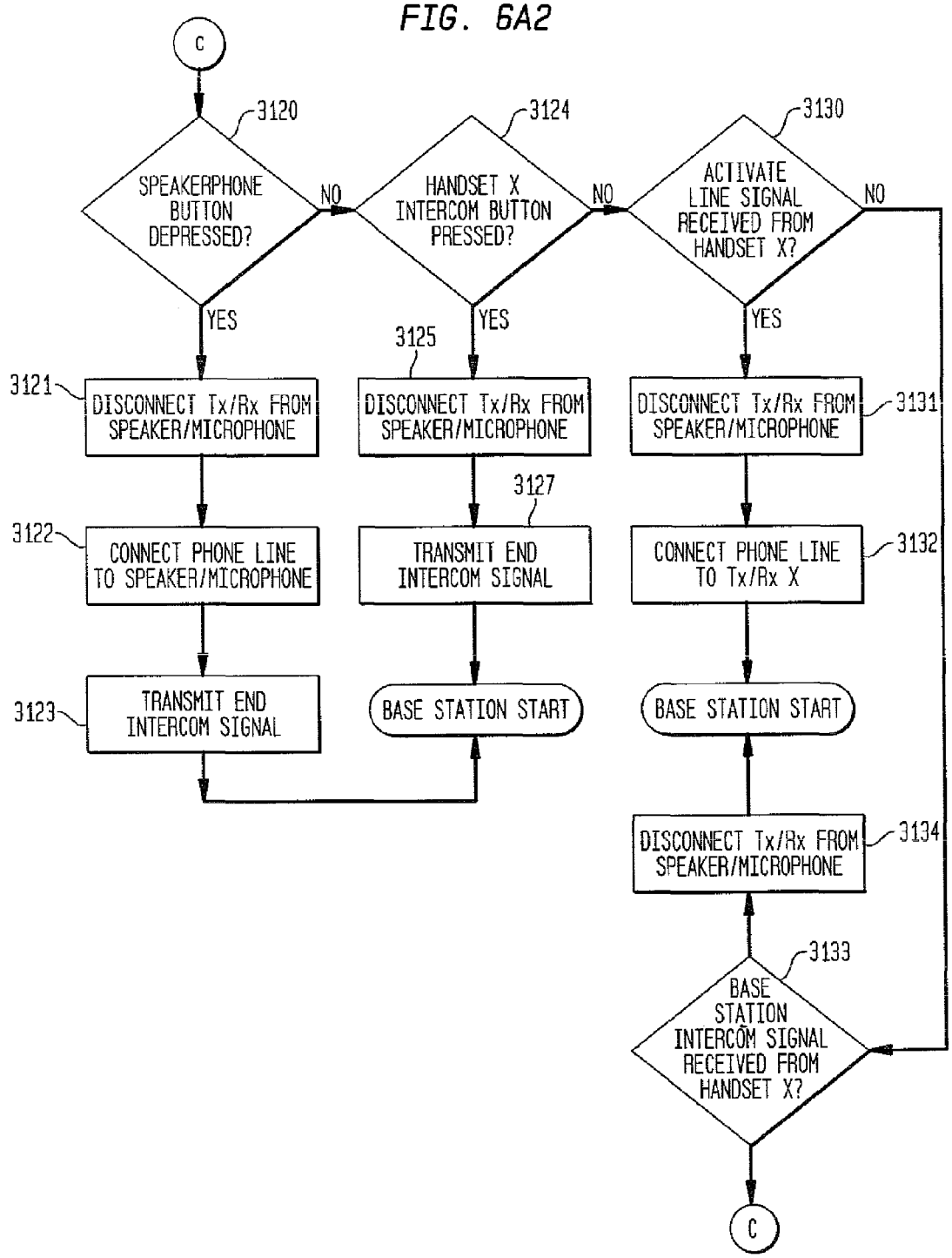
FIG. 6A2

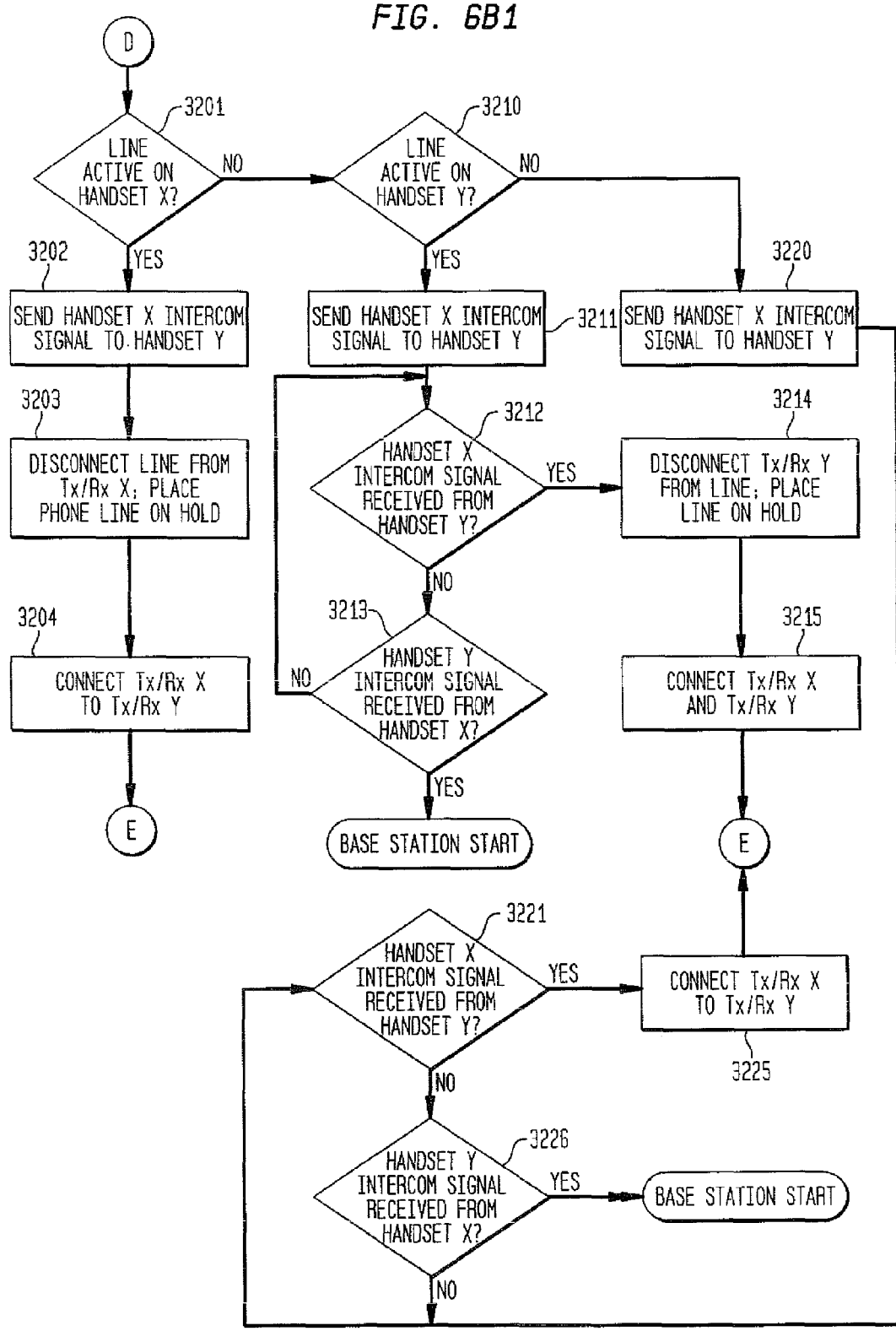
FIG. 6B1

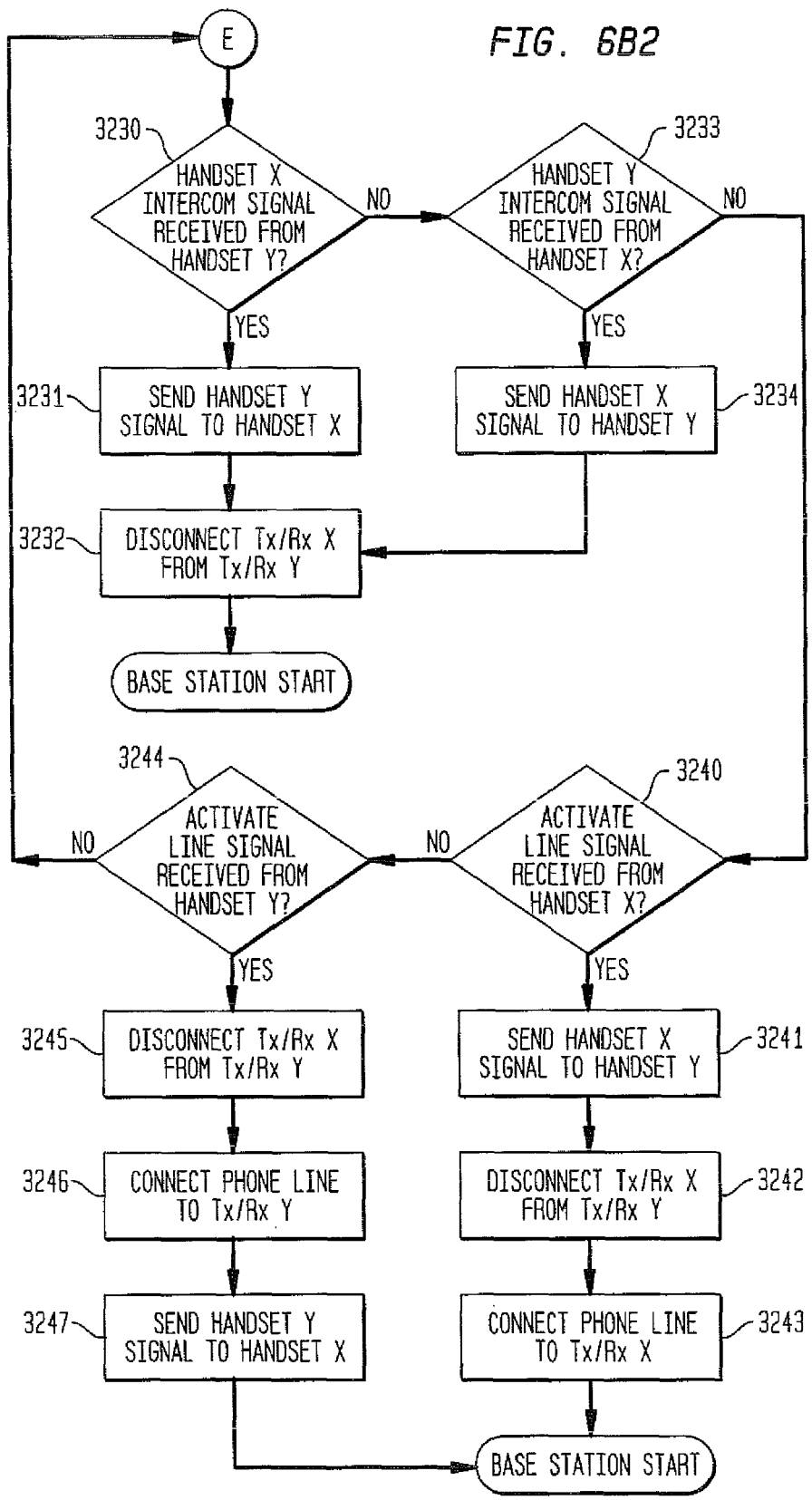
FIG. 6B2

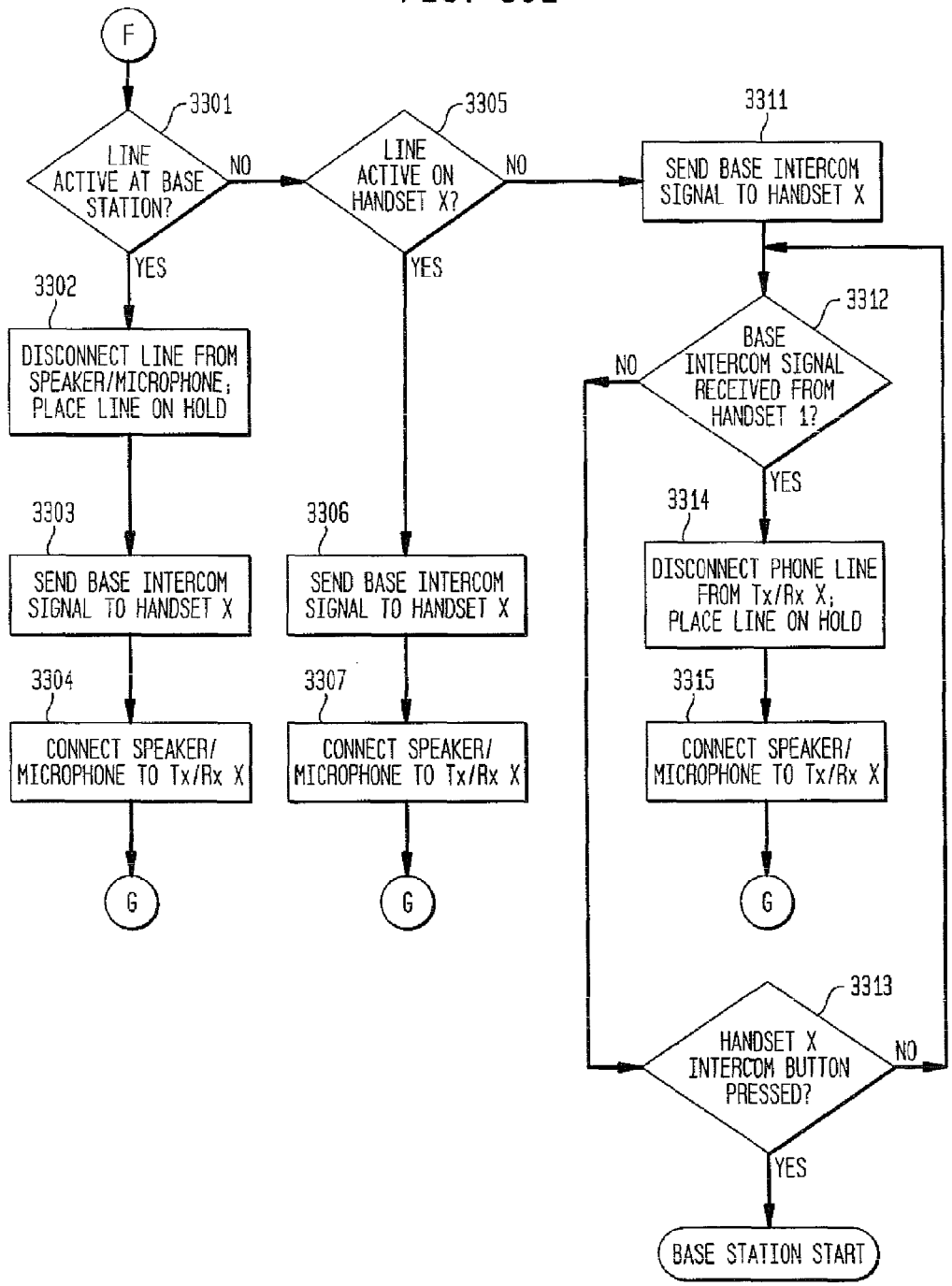
FIG. 6C1

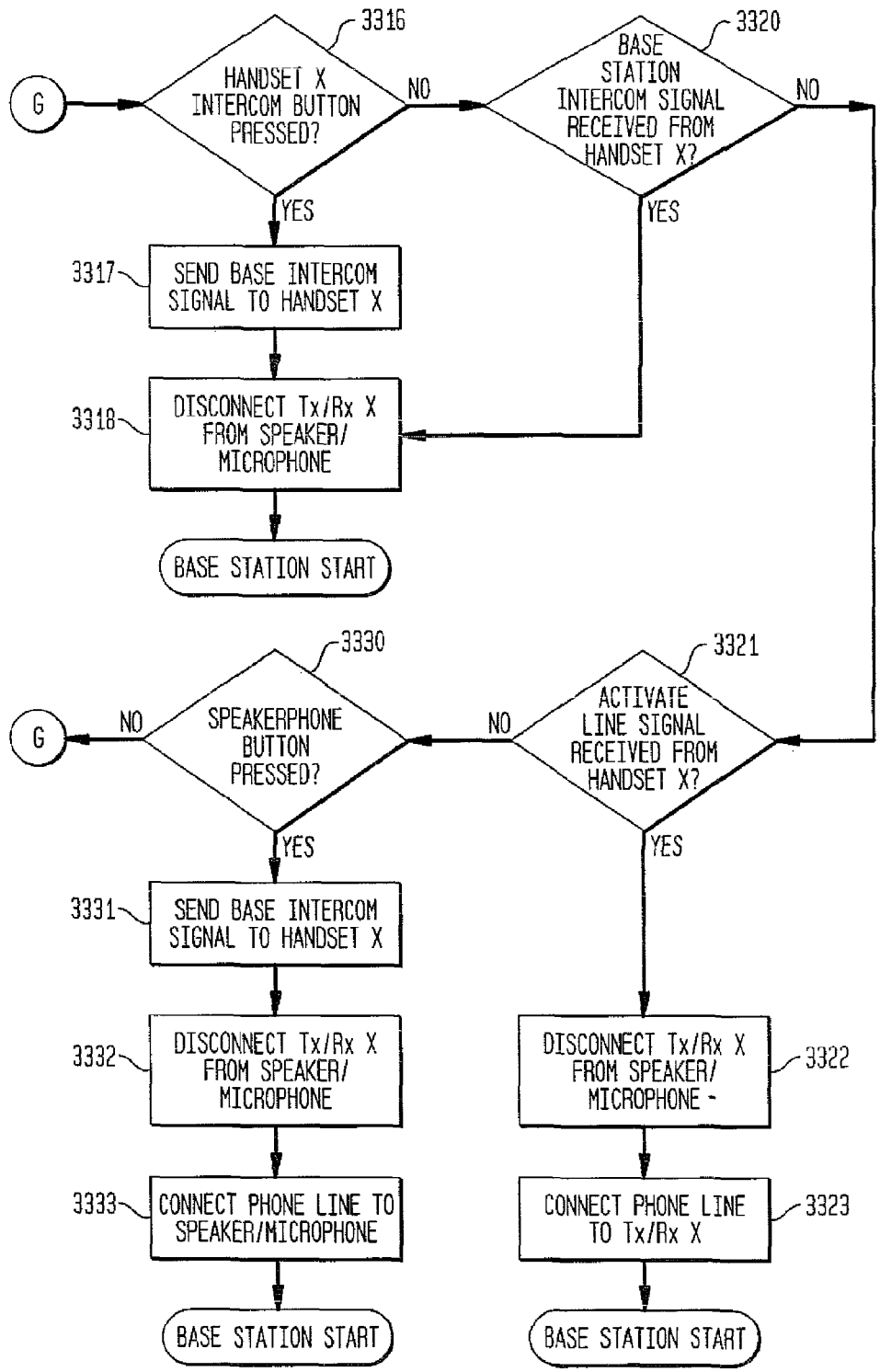
FIG. 6C2

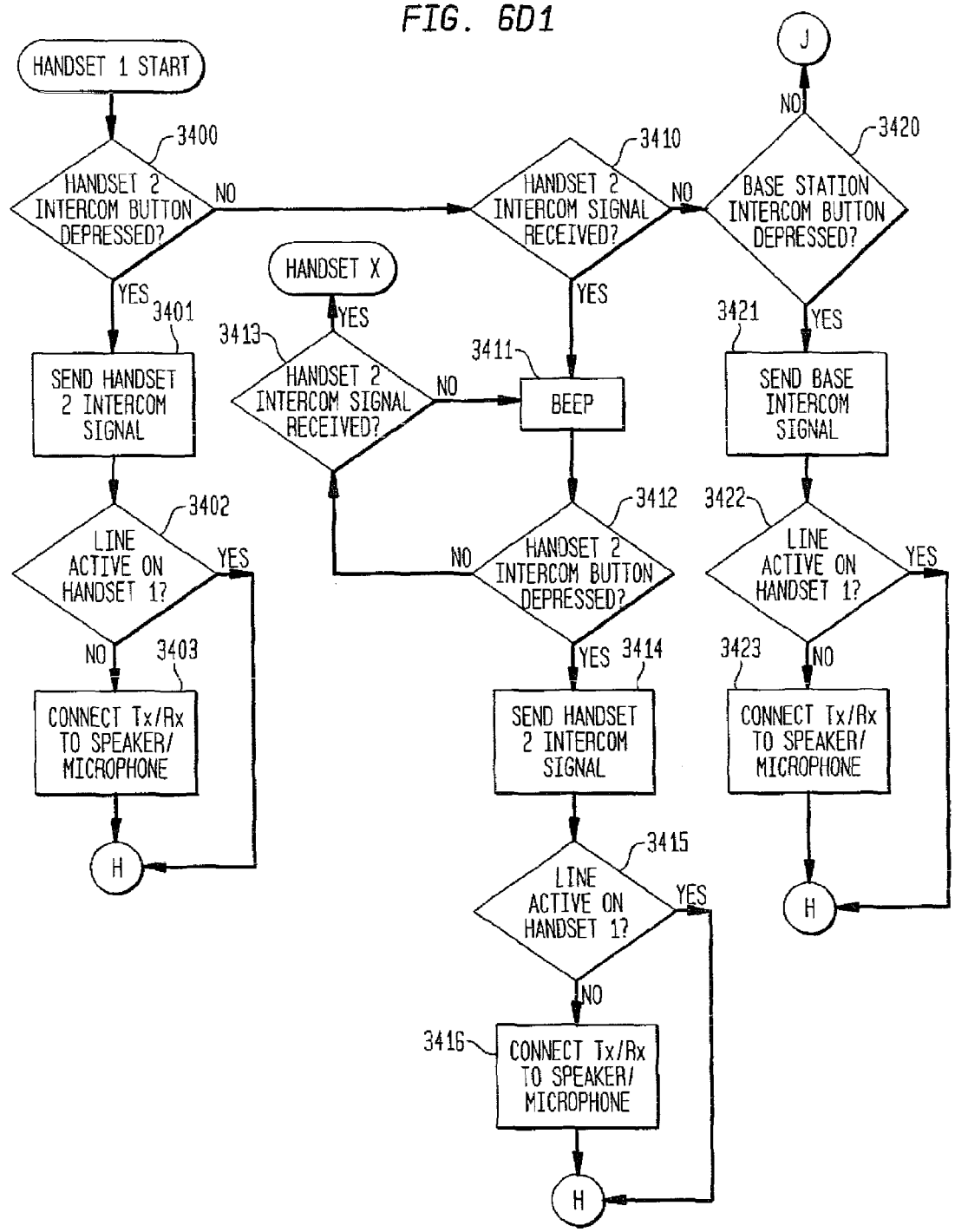
FIG. 6D1

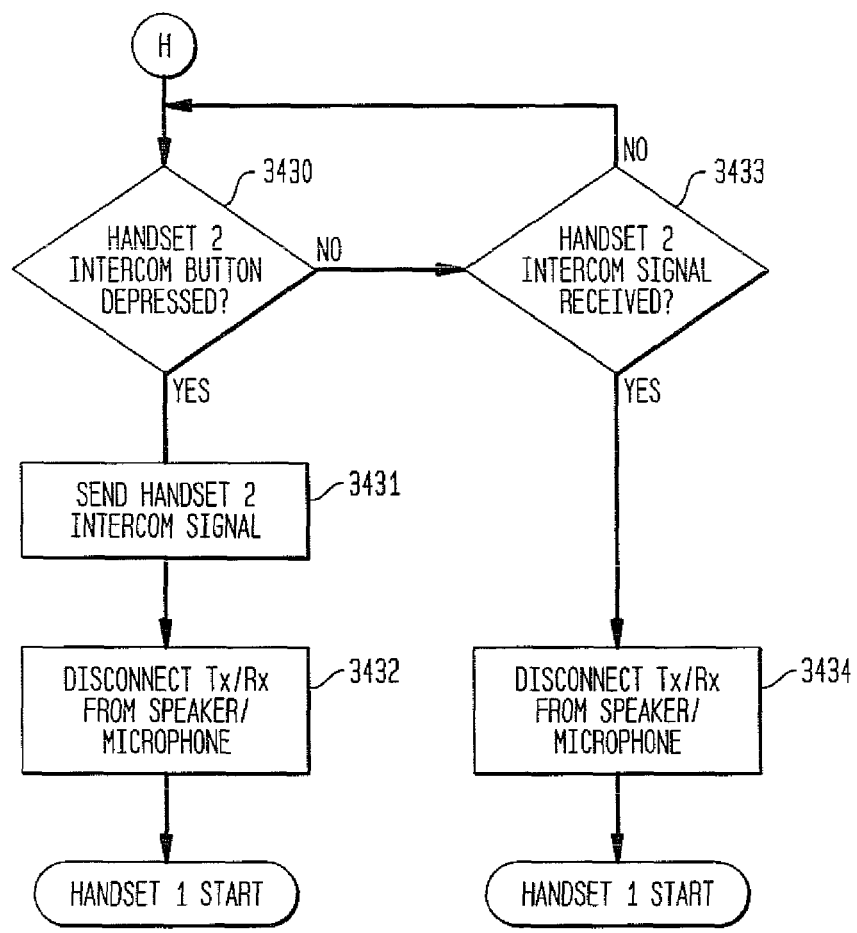
FIG. 6D2

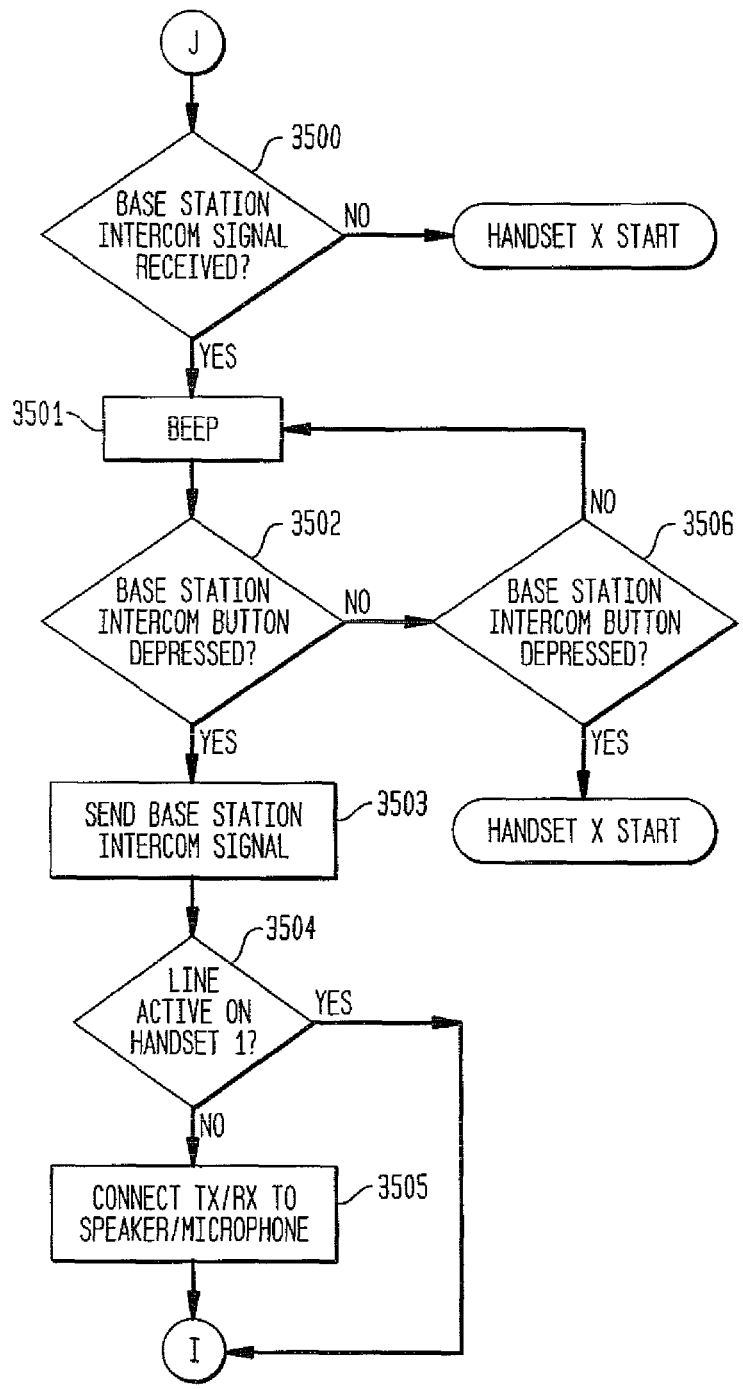
FIG. 6E1

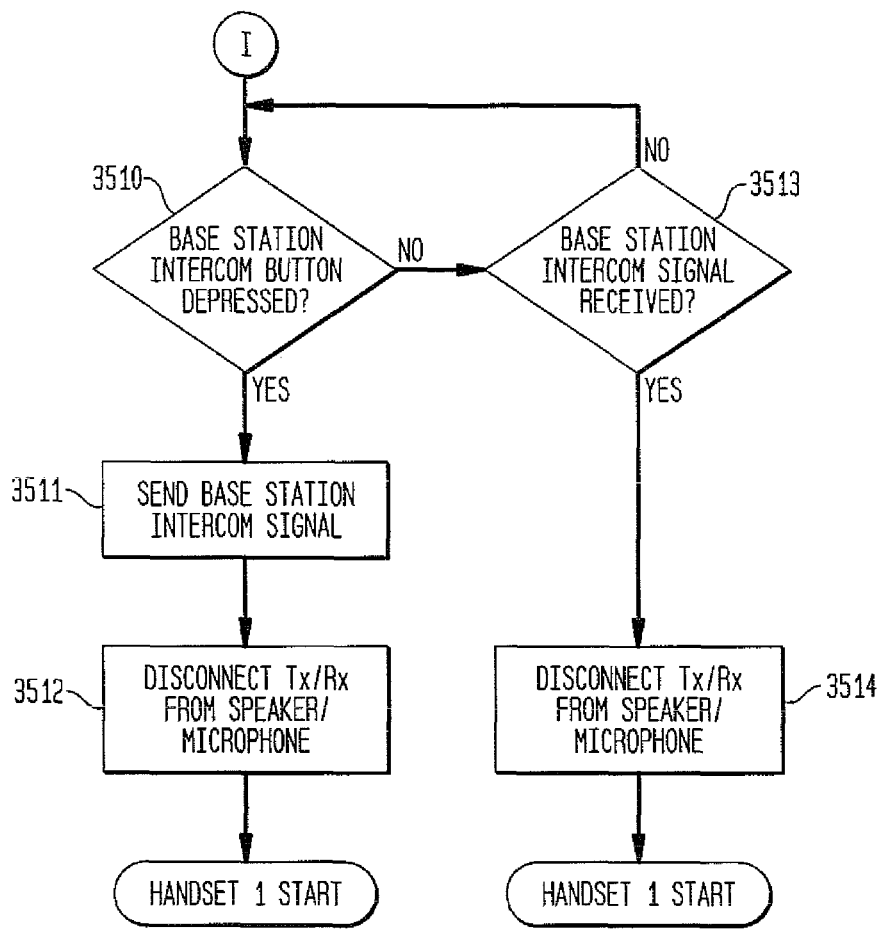
FIG. 6E2

US 8,688,149 B2

CORDLESS TELEPHONE ACTIVE-CALL ENABLED INTERCOM

CROSS-REFERENCE TO RELATED APPLICATION

The instant application is a divisional of U.S. application Ser. No. 13/367,957, filed Feb. 7, 2012, which is a continuation of U.S. application Ser. No. 09/777,889, filed Feb. 7, 2001, the disclosures of both of which are hereby incorporated by reference into the instant application.

FIELD OF THE INVENTION

The present invention relates to a method and apparatus for operating a cordless telephone during an active call.

BACKGROUND OF THE INVENTION

Some cordless telephones have intercoms which allow a person near a base station to speak to a person who has a handset. These telephones, however, do not allow the intercom function to be used during an active call.

What is needed is a convenient way for the person who answers a call with the cordless handset to communicate to the intended recipient via the intercom function that the call is for him/her.

SUMMARY OF THE INVENTION

The present invention overcomes the problems associated with the prior art and provides a unique method and system for allowing a user of a cordless phone telephone handset to use the intercom while a call is active.

In accordance with one aspect of the present invention, the system has a base station and one cordless handset. An intercom communication initiated at either location will cause an active call at either location to be automatically placed on hold for the duration of the intercom communication after which the active call is re-engaged In another aspect of the invention, an active call can be automatically placed on hold during an intercom communication in cordless telephone systems which have more than one handset.

The above and other advantages and features of the invention will be more readily understood from the following detailed description of the invention which is provided in connection with the accompanying drawings.

BRIEF DESCRIPTION OF THE DRAWINGS

FIG. 2b is a flowchart of the algorithm to end an intercom communication in the base station of an active call intercom enabled single handset cordless telephone;

FIG. 3 is a block diagram of an active call intercom enabled multiple handset cordless telephone;

FIG. 4a is a flowchart of the algorithm in the base station of an active call intercom enabled multiple handset cordless telephone.

FIG. 6b is a continuation of the flowchart of the algorithm in the Base station of a multiple handset active call intercom enabled cordless telephone with separate intercoms for each handset;

FIG. 6c is a continuation of the flowchart of the algorithm in the Base station of a multiple handset active call intercom enabled cordless telephone with separate intercoms for each handset;

FIG. 6d is a flowchart of the algorithm in a handset of a multiple handset active call intercom enabled cordless telephone with separate intercoms for each handset;

FIG. 6e is a continuation of the flowchart of the algorithm in the base station of a multiple handset active call intercom enabled cordless telephone with separate intercoms for each handset.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that structural changes may be made and equivalent structures substituted for those shown without departing from the spirit and scope of the present invention.

In a first embodiment of the invention, illustrated in FIGS. 1, 2a, 2b, 2c, a cordless telephone system is shown (FIG. 1) which includes a base station 1000 and a handset 1010. The base station 1000 includes a transmitter/receiver circuit 1001, a line interface 1002, an intercom button 1003, a microprocessor 1004, a speaker/microphone 1005, and a speakerphone button 1006. Handset 1010 includes a transmitter/receiver circuit 1011, a speaker/microphone 1012, a microprocessor 1013, an intercom button 1014, and an activate line button 1015. The base station 1000 may have a speakerphone which is a speaker/microphone 1005 combination or a hardwired handset which also includes a speaker/microphone combination 1005.

In accordance with the first embodiment of a cordless telephone system of the present invention, the cordless handset 1010 has an intercom button 1014, which if depressed while handset 1010 has an active call, automatically puts the call on hold and initiates an intercom communication between handset 1010 and base station 1000. A call is active when a person is speaking to someone on the telephone at either base station 1000 or handset 1010. If the intercom button 1003 at the base station 1000 is depressed while the base station 1000 has an active call, the active call is automatically put on hold and an intercom communication from the base station 1000 to handset 1010 is initiated. If the intercom button 1003 at the base station 1000 is depressed while handset 1010 has an active call, handset 1010 alerts the handset user that the base station 1000 wants to initiate an intercom communication. If the handset 1010 user then presses the intercom button 1014, the active call is automatically put on hold and the intercom is initiated. If an intercom button 1014 at handset 1010 is depressed while the base station 1000 has an active call, the base station 1000 alerts the base station 1000 user that the handset 1010 user wants to initiate an intercom communication. If the base station 1000 user then presses the intercom button 1003, the active call is automatically put on hold and the intercom is initiated.

Figure 1:
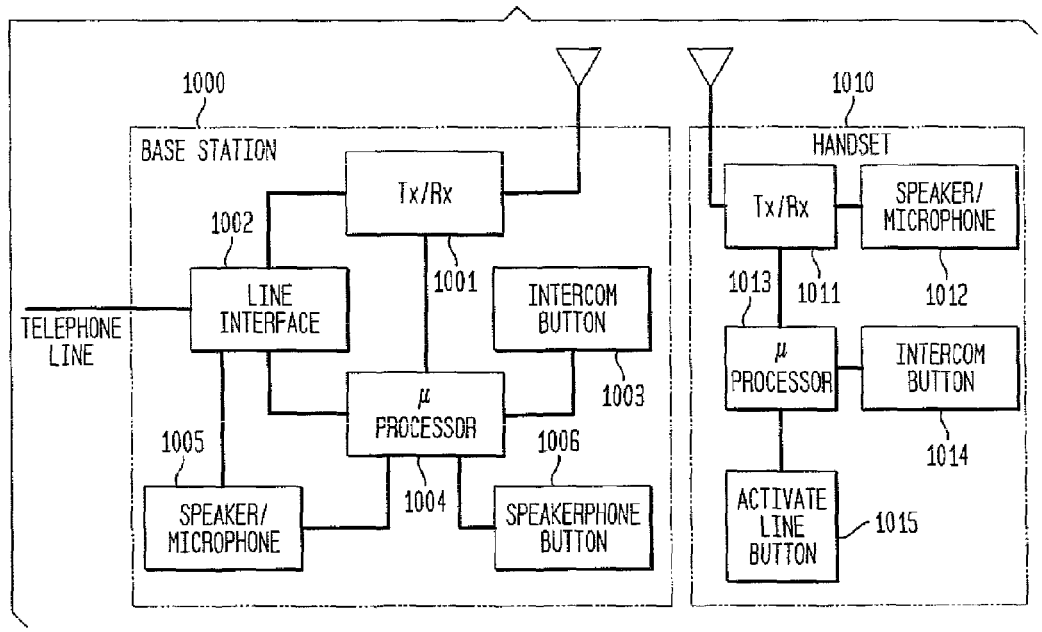
FIG. 1 is a block diagram of an active call intercom enabled cordless telephone with one handset.
Figure 2A:
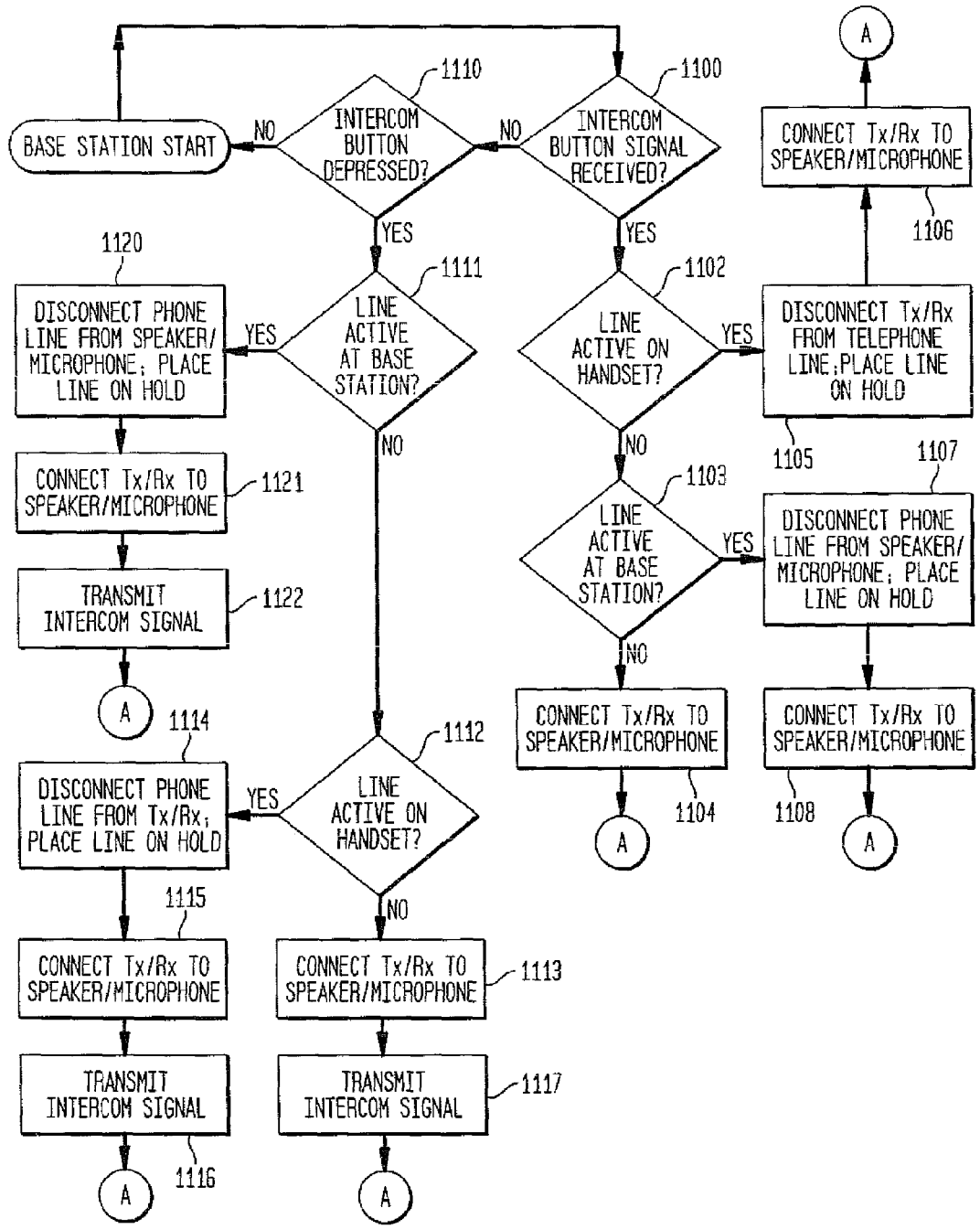
FIG. 2a is a flowchart of the algorithm to initiate an intercom communication in the base station of an active call intercom enabled single handset cordless telephone.

Referring first to the base station processing illustrated in FIG. 2a, FIGS. 2a, 2b illustrate processing respectively performed at the base station 1000 and handset 1010 by respective microprocessors 1004 and 1013 to implement the invention. When the base station 1000 receives an intercom signal transmitted from handset 1010 at processing segment 1100, indicating that the handset 1010 user wants to initiate an intercom communication, the microprocessor 1004 checks if the telephone line is active on handset 1010 at processing segment 1102. If the telephone line is active on handset 1010, then the transmitter/receiver circuit 1001 is disconnected from the telephone line at segment 1105, the active line is placed on hold, and the transmitter/receiver circuit 1001 is connected to the speaker/microphone 1005 at segment 1106, initiating the intercom communication. If the telephone line is not active on handset 1010, the microprocessor 1004 checks if the telephone line is active at the base station 1000 at processing segment 1103. If the telephone line is active at the base station 1000, the telephone line is disconnected from the speaker microphone 1006 at segment 1107, the active line is placed on hold, and the transmitter/receiver circuit 1001 is connected to the speaker/microphone 1006 at segment 1108, initiating the intercom communication. If the telephone line is not active at the base station 1000, then the transmitter/receiver circuit 1001 is connected to the speaker/microphone 1005 at segment 1104.

If the intercom button signal from handset 1010 is not received by the base station 1000, as detected at processing segment 1100, the microprocessor 1004 checks if the base station's intercom button 1003 was depressed at processing segment 1110, indicating that the base station user wants to initiate an intercom communication. If the intercom button 1003 was not depressed, as detected processing segment 1110, the microprocessor returns to the start of base station processing because nothing has happened.

If the intercom button 1003 was depressed, as detected at processing segment 1110, the microprocessor 1004 checks if the telephone line is active at the base station 1000 at processing segment 1111. If the telephone line is active at the base station 1000, as detected at processing segment 1111, the telephone line is disconnected from the speaker/microphone 1006 at segment 1120, putting the call on hold, the transmitter/receiver circuit 1001 is connected to the speaker/microphone 1005 at segment 1121, initiating the intercom communication, and the intercom signal is transmitted from the base station 1000 to handset 1010 at segment 1122.

If the telephone line is not active at the base station 1000, as detected at processing segment 1111, then the microprocessor 1004 checks if the telephone line is active on handset 1010 at processing segment 1112. If the telephone line is not active on handset 1010, as detected at processing segment 1112, transmitter/receiver circuit 1001 is connected to the speaker/microphone 1006 at segment 1113, initiating the intercom communication, and the intercom signal is transmitted from the base station 1000 to handset 1010 at segment 1117. If the telephone line is active on handset 1010, as detected at processing segment 1112, the telephone line is disconnected from the transmitter/receiver circuit 1001 at segment 1114, putting the telephone line on hold, the transmitter/receiver circuit 1001 is connected to the speaker/microphone 1006 at segment 1115, initiating the intercom communication, and the intercom signal is transmitted from the base station 1000 to handset 1010 at segment 1116.

As illustrated in FIG. 2b, after the intercom communication is initiated at segments 1104, 1106, 1108, 1108, 1116, 1117, and 1122, the microprocessor 1004 proceeds to check if the intercom communication should be terminated. The microprocessor 1004 checks if the intercom signal from handset 1010 was received at the base station 1000 at processing segment 1130, indicating that the handset user wants to terminate the intercom communication, i.e. pressed the intercom button. If the intercom button signal from handset 1010 was received at the base station 1000, as detected at processing segment 1130, the transmitter/receiver circuit 1001 is disconnected from the speaker/microphone 1006 at segment 1131, terminating the intercom communication.

If the intercom button signal from handset 1010 is not received by the base station 1000, as detected at processing segment 1130, the microprocessor 1004 checks if the base station's intercom button 1003 was depressed at processing segment 1138, indicating that the base station user wants to terminate the intercom communication. If the base station's intercom button 1003 was depressed, as detected at processing segment 1138, the microprocessor 1004 transmits the end intercom signal to handset 1010 at segment 1140, disconnects the transmitter/receiver circuit 1001 from the speaker/microphone 1006 at segment 1131, terminating the intercom communication, and returns to the start of base station processing.

If the base station's intercom button 1003 was not depressed, as detected at processing segment 1138, the microprocessor 1004 checks if the speakerphone button 1006 (i.e. the base station's activate line button) was depressed at processing segment 1132, indicating that the base station user wants to terminate the intercom communication and activate the telephone line. If the speakerphone button 1006 was depressed, as detected at processing segment 1132, the transmitter/receiver circuit 1001 is disconnected from the speaker/microphone 1005 at segment 1133, terminating the intercom communication, the telephone line is connected to speaker/microphone 1005 at segment 1134, activating the line at the base station, and the end intercom signal is transmitted by the base station 1000 to handset 1010 at segment 1139.

If the speakerphone button 1006 is not depressed, as detected at processing segment 1132, the microprocessor 1004 checks if an activate line signal from handset 1010 is received at base station 1000 at processing segment 1135, indicating that the handset 1010 user wants to terminate the intercom communication and activate the line, i.e. pressed activate line button 1015 on handset 1010. If an activate line signal is received by the base station 1000 from handset 1010, as detected at processing segment 1135, the transmitter/receiver circuit 1001 is disconnected from the speaker/microphone 1005 at segment 1136, terminating the intercom communication. Then, the telephone line is connected to transmitter/receiver circuit 1001 at segment 1137, activating the telephone line on handset 1010.

If an activate line signal is not received by the base station 1000 from handset 1010, as detected at processing segment 1135, the microprocessor 1004 returns to processing segment 1130 and continues the loop until the intercom communication should be terminated.

Figure 2C:
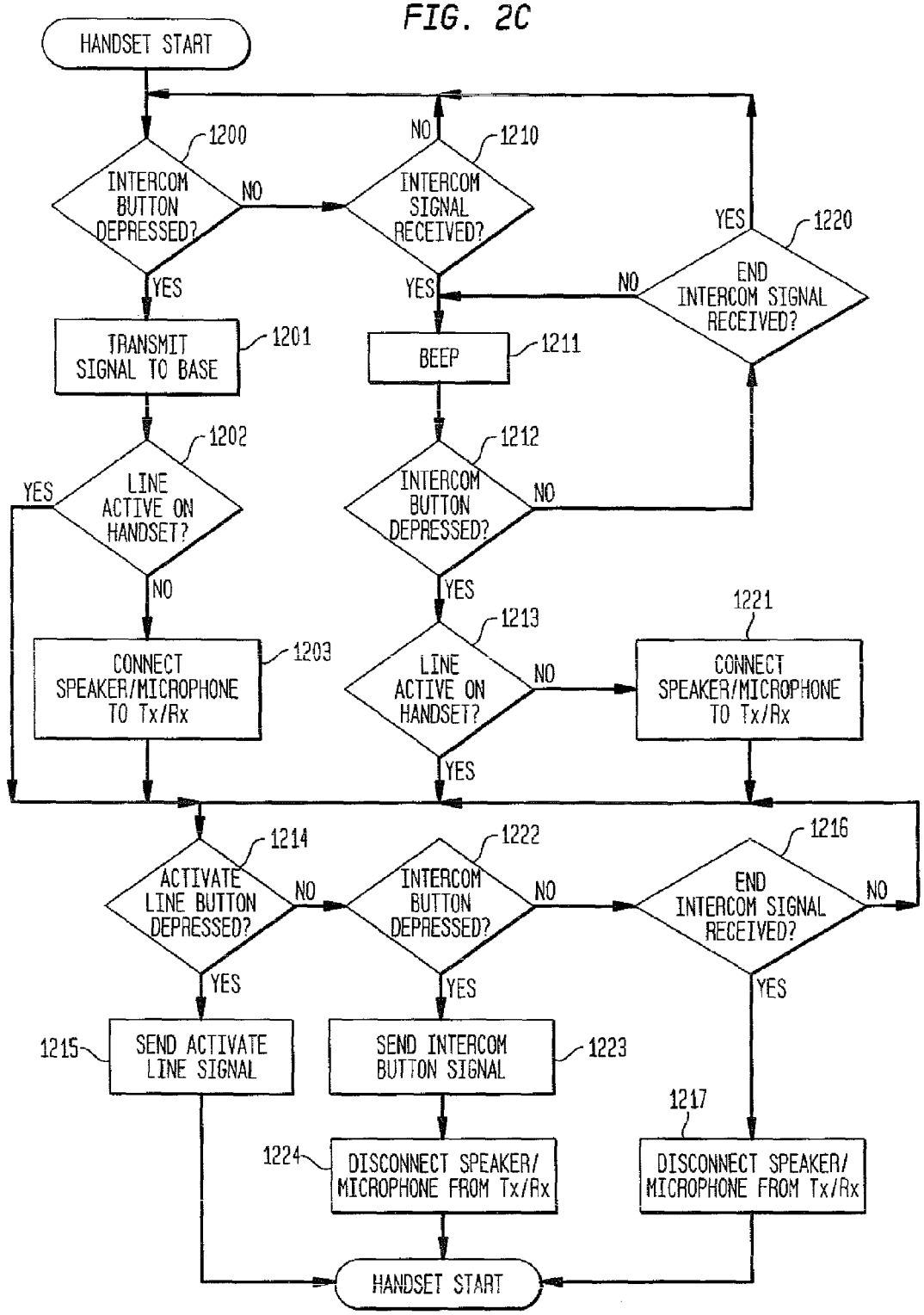
FIG. 2c is a flowchart of the algorithm in the handset of an active call intercom enabled single handset cordless telephone.

FIG. 2c illustrates the process flow at handset 1010. If the intercom button 1014 is not depressed, as detected at processing segment 1200, the microprocessor 1013 checks if the intercom signal from base station 1000 is received at handset 1010 at processing segment 1210, indicating that the base station user wants to initiate an intercom communication. If the intercom signal from base station 1000 is not received at handset 1010, as detected at processing segment 1210, the microprocessor returns to the start of handset processing.

When handset 1010 intercom button 1014 is depressed, as detected at processing segment 1200, the intercom button 1014 signal is transmitted by handset 1010 to the base station 1000 at segment 1201, indicating that an intercom communication should be initiated. Handset 1010 then checks if the telephone line is active at handset 1010 at processing segment 1202. If the telephone line is not active on handset 1010, as detected at processing segment 1202, the speaker/microphone 1012 is connected to the transmitter/receiver circuit 1011 at segment 1203 preparing the cordless handset for an intercom communication. The microprocessor 1013 then proceeds to processing segment 1214 to determine if the intercom communication should be terminated.

If the intercom signal from base station 1000 is received by handset 1010 at processing segment 1210, requesting an intercom communication, handset 1010 sends a signal to the speaker/microphone 1012 to beep at segment 1211 to alert the user that an intercom communication is requested. The microprocessor 1013 then checks if the intercom button 1014 was depressed at processing segment 1212, indicating that the handset user also wants to initiate an intercom communication. If the intercom button was not depressed, as detected at processing segment 1212, the microprocessor 1013 checks if the end intercom signal from base station 1000 was received by handset 1010 at processing segment 1220, indicating that the base station user no longer wants to initiate an intercom communication. If the end intercom signal from base station 1000 was received by handset 1010, as detected at processing segment 1220, indicating that the request for an intercom communication has been removed, handset 1010 returns to the start of handset processing. If the end intercom signal from base station 1000 was not received by handset 1010, handset 1010 returns to segment 1211 to alert the user again that an intercom communication is requested.

If the intercom button was depressed, as detected at processing segment 1212, indicating that the handset user also wants to initiate an intercom communication, then the microprocessor 1013 checks if the telephone line is active on handset 1010 at processing segment 1213. If the telephone line is not active, as detected at processing segment 1213, the speaker/microphone 1012 is connected to the transmitter/receiver circuit 1011 at segment 1221, preparing handset 1010 for an intercom communication. Once the intercom communication is initiated at segment 1221, the microprocessor 1013 proceeds to processing segment 1214 to determine if the intercom communication should be terminated. If the line is active, as detected at processing segment 1213, handset 1010 is already prepared for an intercom communication and the microprocessor proceeds to processing segment 1214 to determine if the intercom communication should be terminated.

Once the intercom communication is initiated, the microprocessor 1013 checks if the activate line button 1015 was depressed at processing segment 1214, indicating that the intercom communication should be terminated and the line activated. If the activate line button was depressed, as detected at processing segment 1214, then handset 1010 sends an activate line signal to the base station 1000 at segment 1215. The microprocessor 1013 then proceeds to the start of handset processing.

If the activate line button was not depressed, as detected at processing segment 1214, the microprocessor 1013 checks if the intercom button 1014 was depressed at processing segment 1222, indicating that the intercom communication should be terminated. If the intercom button 1014 was depressed, as detected at processing segment 1222, indicating that the intercom communication should be terminated, then handset 1010 sends the intercom button 1014 signal to the base station 1000 at segment 1223 and disconnects the speaker/microphone 1012 from the transmitter/receiver circuit 1011 at segment 1224.

If the intercom button 1014 was not depressed, as detected at processing segment 1222, the microprocessor 1013 checks if the end intercom signal from base station 1000 was received by handset 1010 at processing segment 1216, indicating that the base station 1000 user wants to terminate the intercom communication. If the end intercom signal from base station 1000 was received by handset 1010, as detected at processing segment 1216, handset 1010 disconnects the speaker/microphone 1012 from the transmitter/receiver circuit 1011 at segment 1217 and returns to processing segment 1200. If the end intercom signal from base station 1000 is not received by handset 1010, as detected at processing segment 1216, the microprocessor 1013 returns to processing segment 1214 to continue checking for an indication that the intercom communication should be terminated.

Accordingly, no matter which of the base station 1000 and handset 1010 initiates an intercom communication during an active call, the active call is placed on hold during the intercom communication and is resumed when the intercom communication is over.

Figure 4B:
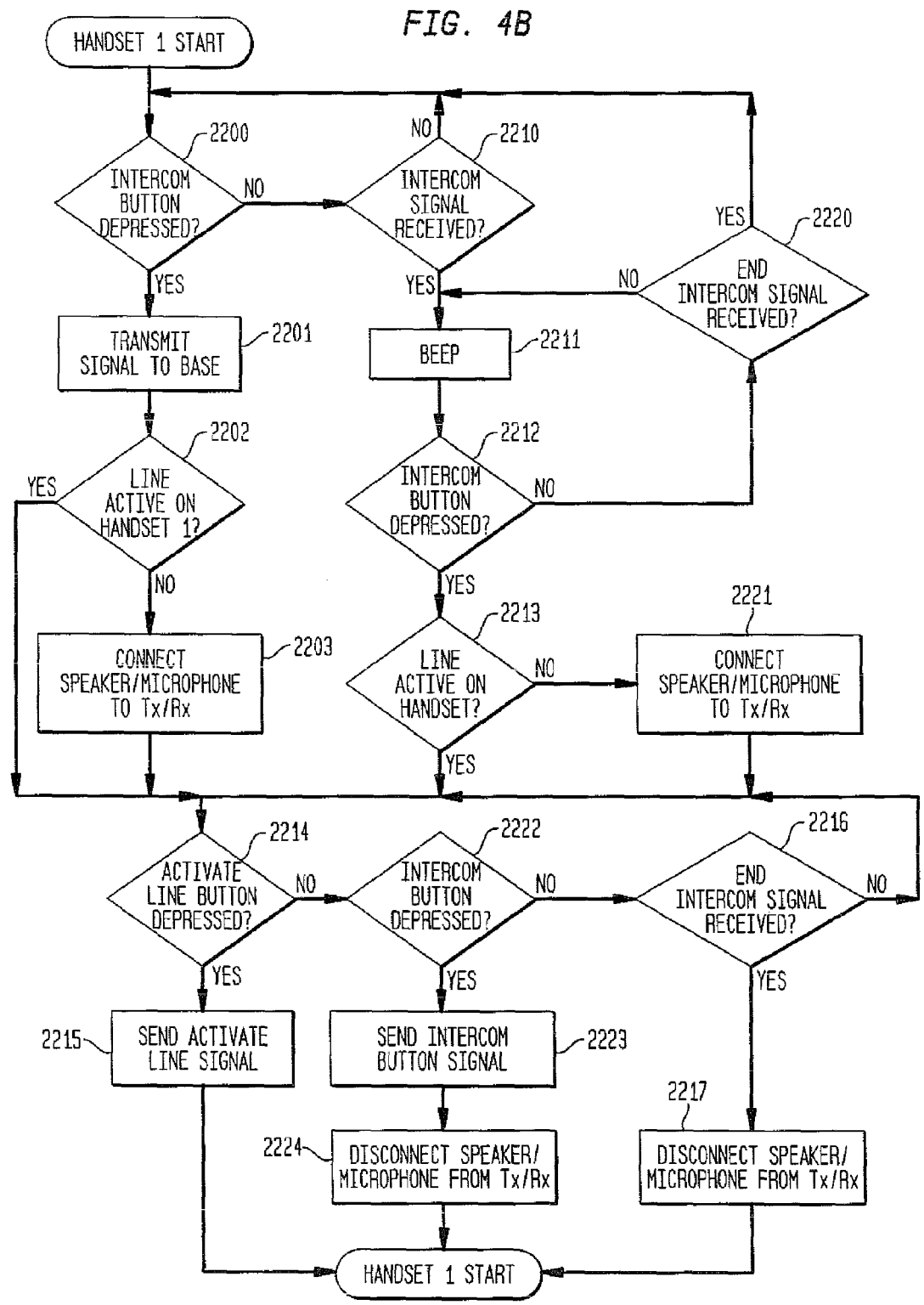
FIG. 4b is a flowchart of the algorithm in a handset of an active call intercom enabled multiple handset cordless telephone.

FIGS. 3, 4 and 4b show a second embodiment which includes, as shown in FIG. 3, a base station 2000 a first handset 2010 and a second handset 2020. The base station includes a transmitter/receiver circuit 2001, a line interface 2002, an intercom button 2003, a microprocessor 2004, a speaker/microphone 2005, and a speakerphone button 2006. Handset 2010 includes a transmitter/receiver circuit 2011, a speaker/microphone 2012, a microprocessor 2013, an intercom button 2014, and an activate line button 2015. Handset 2020 includes a transmitter/receiver circuit 2021, a speaker/microphone 2022, a microprocessor 2023, an intercom button 2024, and an activate line button 2025. The base station 2000 may have a speakerphone which is a speaker/microphone 2005 combination or a hardwired handset which also includes a speaker/microphone 2005 combination.

When the intercom button 2014 or 2024 is depressed on a handset 2010 or 2020 where the call is active, the call is automatically put on hold and the intercom is initiated between all handsets 2010 and 2020 and the base station 2000. When the intercom button 2003 is depressed at the base station 2000 while the call is active at the base station 2000, the call is automatically put on hold and handsets 2010 and 2020 alert any users that the base station 2000 wants to initiate an intercom. If either handset 2010 or 2020 then depresses its intercom button 2014 or 2024, the intercom is initiated. Otherwise, if the base station 2000 activate line button 2006 is depressed, the telephone line is re-activated. If the base station 2000 intercom button 2003 is depressed, the call is left on hold and handsets 2010 and 2020 end the intercom notification. When one of the intercom buttons 2003, 2014 or 2015 is depressed while the telephone line is active in another location, the intercom is not initiated until the active location depresses the intercom button 2003, 2014 or 2015.

FIG. 4a illustrates process flow for the base station 2000 of the second embodiment of the invention. When the base station 2000 does not receive an intercom signal from a handset 2010 or 2020 at processing segment 2100, it checks if the intercom button 2003 was depressed at processing segment 2130. If the intercom button 2003 is not depressed, as detected at processing segment 2130, the microprocessor 2004 returns to processing segment 2100.

If an intercom button 2003 signal is received from handset 2010 or 2020 at processing segment 2100, indicating that handset user wants to initiate an intercom communication, the microprocessor 2004 checks if the telephone line is active at processing segment 2101. If the telephone line is inactive, as detected at processing segment 2101, the base station 2000 transmits an intercom signal to handsets 2010 and 2020 at segment 2102 and connects the transmitter/receiver circuit 2001 to the speaker/microphone 2005 at segment 2103 initiating the intercom communication.

If the telephone line is active, as detected at processing segment 2101, the microprocessor 2004 checks if the telephone line is active in the same location as the intercom signal originated at processing segment 2110. If the telephone line is active in the same place, as detected at processing segment 2110, the base station 2000 disconnects the transmitter/receiver circuit 2001 from the telephone line at segment 2120 and connects the transmitter/receiver circuit 2001 to the speaker/microphone 2005 at segment 2121 initiating the intercom communication.

If the telephone line is active in a different place than the intercom signal originated, as detected at processing segment 2110, then the base station 2000 transmits an intercom signal at segment 2111 indicating to the other locations that a user wants to initiate an intercom communication. If an intercom signal from a handset 2010 or 2020 is not received by base station 2000, as detected at processing segment 2112, the microprocessor 2004 checks if the intercom button 2003 is depressed at processing segment 2115, indicating that the base station user no longer wants to initiate an intercom communication. If the intercom button 2003 is depressed, as detected at processing segment 2115, the microprocessor 2004 returns to the start of base station processing. If the intercom button is not depressed, as detected at processing segment 2115, then the microprocessor 2004 returns to processing segment 2112 to continue the loop until the intercom is initiated or cancelled.

If an intercom signal from a handset 2010 or 2020 is received by base station 2000, as detected at processing segment 2112, indicating that the active handset user also wants to initiate an intercom communication, the telephone line is disconnected from the transmitter/receiver circuit 2001 at segment 2113 and the transmitter/receiver circuit 2001 is connected to the speaker/microphone 2005 at segment 2114 initiating an intercom communication.

If the intercom button 2003 is depressed, as detected at processing segment 2130, indicating that the base station 2000 user wants to initiate an intercom communication, then the microprocessor 2004 checks if the telephone line is active at the base station 2000 at processing segment 2131. If the telephone line is active at the base station 2000, as detected at processing segment 2130, then the base station 2000 disconnects the telephone line from the speaker/microphone 2005 at segment 2140, connects the transmitter/receiver circuit 2001 to the speaker/microphone 2005 at segment 2141, and transmits an intercom signal at segment 2142, initiating the intercom communication.

If the telephone line is inactive at the base station 2000, as detected at processing segment 2131, the microprocessor 2004 checks if the telephone line is active on a handset 2010 or 2020 at processing segment 2132. If the telephone line is not active on a handset 2010 or 2020, as detected at processing segment 2132, the base station 2000 connects the transmitter/receiver circuit 2001 to the speaker/microphone 2005 at segment 2133 and transmits an intercom signal to handsets 2010 and 2020 at segment 2134, initiating the intercom communication.

If the telephone line is active on a handset 2010 or 2020, as detected at processing segment 2132, the base station 2000 disconnects the telephone line from the transmitter/receiver circuit 2001 at segment 2135, connects the transmitter/receiver circuit 2001 to the speaker/microphone 2005 at segment 2136, and transmits an intercom signal at segment 2137, initiating the intercom communication.

After the intercom communication is initiated at segments 2103, 2114, 2121, 2142, 2135, and 2134, the base station 2000 determines if the intercom communication should be terminated. The microprocessor 2004 checks if the activate line button signal is received at processing segment 2150, indicating that the handset 2010 or 2020 user wants to terminate the intercom communication and activate the line. If the activate line button signal is received, as detected at processing segment 2150, the base station 2000 disconnects the transmitter/receiver circuit 2001 from the speaker/microphone 2005 at segment 2151, terminating the intercom communication, connects the telephone line and transmitter/receiver circuit 2001 at segment 2152, activating the line at handset 2010 or 2020, transmits the end intercom signal at segment 2153 and returns to the start of base station processing.

If the activate line button signal is not received, as detected at processing segment 2150, the microprocessor 2004 checks if the speakerphone button 2006 was depressed at processing segment 2160, indicating that the base station 2000 user wants to terminate the intercom communication and activate the line at the base station 2000. If the speakerphone button 2006 is depressed, as detected at processing segment 2160, the base station 2000 disconnects the transmitter/receiver circuit 2001 from the speaker/microphone 2005 at segment 2161, terminating the intercom communication, connects the telephone line and speakerphone 2006 at segment 2162, activating the line at the base station, transmits the end intercom signal at segment 2163, and returns the start of base station processing.

If the speakerphone button is not depressed, as detected at processing segment 2160, the microprocessor 2004 checks if the intercom signal from a handset 2010 or 2020 is received at processing segment 2164, indicating that the handset 2010 or 2020 user wants to terminate the intercom communication. If the intercom signal from a handset 2010 or 2020 is received by base station 2000, as detected at processing segment 2164, the base station 2000 disconnects the transmitter/receiver circuit 2001 from the speaker/microphone 2005 at segment 2165, terminating the intercom communication, transmits the end intercom signal to handsets 2010 and 2020 at segment 2163, and returns to the start of base station processing.

If the intercom signal from a handset 2010 or 2020 is not received by base station 2000, as detected at processing segment 2164, the microprocessor 2004 checks if the intercom button 2003 was depressed at processing segment 2166, indicating that the base station 2000 user wants to terminate the intercom communication. If the intercom button was depressed, as detected at 2166, the base station 2000 disconnects the transmitter/receiver circuit 2001 at segment 2165, terminating the intercom communication, transmits the end intercom signal at segment 2163, and returns to processing segment 2100.

If the intercom button is not depressed, as detected at processing segment 2166, the microprocessor 2004 returns to processing segment 2150 to repeat the loop until the intercom communication should be terminated.

FIG. 4b illustrates the process flow at handset 1 2010. The process flow for handset 2 2020 is identical. If the intercom button 2014 is not depressed, as detected at processing segment 2200, the microprocessor 2013 checks if the intercom signal from base station 2000 is received by handset 2010 at processing segment 2210, indicating that the base station user or the handset 2 user wants to initiate an intercom communication. If the intercom signal from base station 2000 is not received by handset 2010, as detected at processing segment 2210, the microprocessor returns to the start of handset 1 processing.

When handset 1 2010 intercom button 2014 is depressed, as detected at processing segment 2200, the intercom button 2014 signal is transmitted by handset 1 2010 to the base station 2000 at segment 2201, indicating that an intercom communication should be initiated. Handset 1 2010 then checks if the telephone line is active at handset 1 2010 at processing segment 2202. If the telephone line is not active at handset 1 2010, as detected at processing segment 2202, the speaker/microphone 2012 is connected to the transmitter/receiver circuit 2011 at segment 2203 preparing handset 1 for an intercom communication. The microprocessor 2013 then proceeds to processing segment 2214 to determine if the intercom communication should be terminated.

If the intercom signal from base station 20000 is received from handset 1 2010 at processing segment 2210, requesting an intercom communication, handset 1 2010 sends a signal to the speaker/microphone 2012 to beep at segment 2211 to alert the user that an intercom communication is requested. The microprocessor 2013 then checks if the intercom button 2014 was depressed at processing segment 2212, indicating that the handset 1 user also wants to initiate an intercom communication. If the intercom button was not depressed, as detected at processing segment 2212, the microprocessor 2013 checks if the end intercom signal from base station 2000 was received by handset 1 2010 at processing segment 2220, indicating that the base station 2000 user or the handset 2 2020 user no longer wants to initiate an intercom communication. If the end intercom signal from base station 2000 was received by handset 1 2010, as detected at processing segment 2220, indicating that the request for an intercom communication has been cancelled, handset 1 2010 returns to the start of handset 1 processing. If the end intercom signal from base station 2000 was not received by handset 1 2010, as detected at processing segment 2220, handset 1 2010 returns to segment 2211 to alert the user again that an intercom communication is requested.

If the intercom button was depressed, as detected at processing segment 2212, indicating that the handset 1 user also wants to initiate an intercom communication, then the microprocessor 2013 checks if the telephone line is active on handset 1 2010 at processing segment 2213. If the telephone line is not active, as detected at processing segment 2213, the speaker/microphone 2012 is connected to the transmitter/receiver circuit 2011 at segment 2221, preparing handset 1 2010 for an intercom communication. Once the intercom communication is initiated at segment 2221, the microprocessor 2013 proceeds to processing segment 2214 to determine if the intercom communication should be terminated. If the line is active, as detected at processing segment 2213, handset 2010 is already prepared for an intercom communication and the microprocessor proceeds to processing segment 2214 to determine if the intercom communication should be terminated.

Once the intercom communication is initiated, the microprocessor 2013 checks if the activate line button 2015 was depressed at processing segment 2214, indicating that the intercom communication should be terminated and the line activated at handset 1. If the activate line button was depressed, as detected at processing segment 2214, then handset 1 2010 sends an activate line signal to the base station 2000 at segment 2215. The microprocessor 2013 then proceeds to the start of handset 1 processing.

If the activate line button was not depressed, as detected at processing segment 2214, the microprocessor 2013 checks if the intercom button 2014 was depressed at processing segment 2222, indicating that the intercom communication should be terminated. If the intercom button 2014 was depressed, as detected at processing segment 2222, indicating that the intercom communication should be terminated, then handset 1 2010 sends the intercom button 2014 signal to the base station 2000 at segment 2223 and disconnects the speaker/microphone 2012 from the transmitter/receiver circuit 2011 at segment 2224.

If the intercom button 2014 was not depressed, as detected at processing segment 2222, the microprocessor 2013 checks if the end intercom signal from base station 2000 was received by handset 1 2010 at processing segment 2216, indicating that the base station 2000 user or the handset 2 user wants to terminate the intercom communication. If the end intercom signal from base station 2000 was received by handset 1 2010, as detected at processing segment 2216, handset 1 2010 disconnects the speaker/microphone 2012 from the transmitter/receiver circuit 2011 at segment 2217 and returns to processing segment 2200. If the end intercom signal from base station 2000 is not received by handset 1 2010, as detected at processing segment 2216, the microprocessor 2013 returns to processing segment 2214 to continue checking for an indication that the intercom communication should be terminated.

Accordingly, no matter which of the base station 2000, handset 1 2010, or handset 2 2020 initiates an intercom communication during an active call, the active call is placed on hold during the intercom communication and is resumed when the intercom communication is over.

Figure 5:
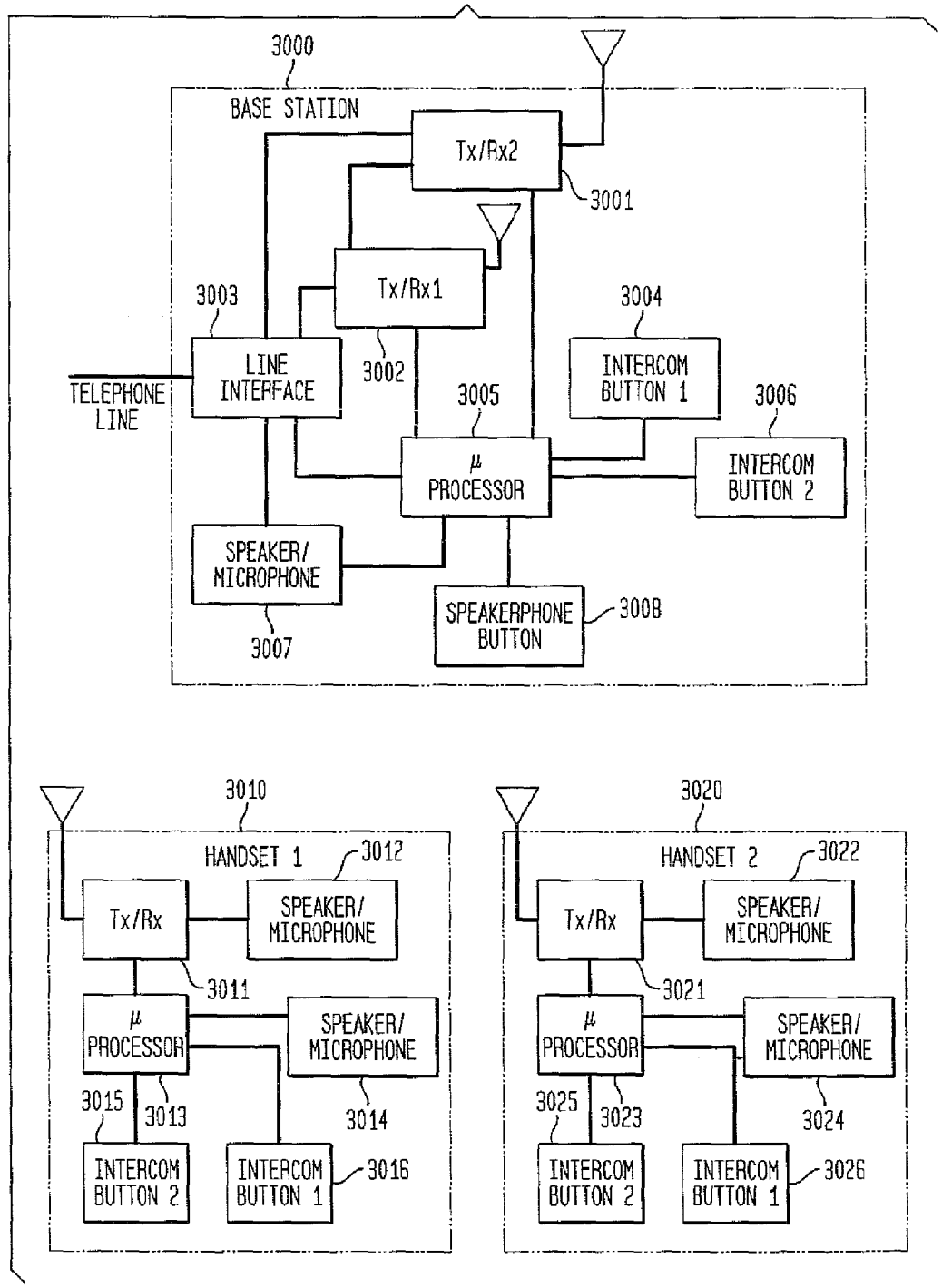
FIG. 5 is a block diagram of a multiple handset active call intercom enabled cordless telephone with separate intercoms for each handset.

FIGS. 5, 6, 6a, 6b, 6c, 6d and 6e show a third embodiment of the invention which includes, as shown in FIG. 5 a base station 3000 a first handset 3010 and a second handset 3020. Unlike the cordless telephone system show in FIG. 3, the present embodiment has separate intercom buttons for each other unit. This allows it allows an intercom communication that does not include all of the handsets or the base station. In addition, this system allows intercom communications between inactive units while another unit is active. The base station 3000 includes a first transmitter/receiver circuit 3002, a second transmitter/receiver circuit 3001, a line interface 3003, a first intercom button 3004, a second intercom button 3006, a microprocessor 3005, a speaker/microphone 3007, and a speakerphone button 3008. The first handset 3010 includes a transmitter/receiver circuit 3011, a speaker/microphone 3012, a microprocessor 3013, an activate line button 3014, a first intercom button 3016, and a second intercom button, 3015. The second handset 3020 includes a transmitter/receiver circuit 3021, a speaker/microphone 3022, a microprocessor 3023, an activate line button 3024, a first intercom button 3026, and a second intercom button, 3025. The base station 3000 may have a speakerphone which is a speaker/microphone 3005 combination or a hardwired handset which also includes a speaker/microphone 3005 combination.

In accordance with the third embodiment of the invention, when a handset 3010 or 3020 intercom button 3004 or 3006 is depressed at the base station 3000 while the telephone line is active on the base station 3000, the active line is placed on hold and the selected handset alerts the user. If the user of that handset 3010 or 3020 then depresses the base station intercom button 3015 or 3025, the intercom is initiated. When a handset intercom button 3016 or 3026 is depressed from another handset 3010 or 3020 while the telephone line is active on that handset, the active line is placed on hold and the selected handset 3010 or 3020 alerts the user. If the user then depresses handset intercom button 3016 or 3026 for handset 3010 or 3020 requesting the intercom, the intercom is initiated. When the intercom button is depressed from an inactive location requesting an intercom with an active location, the active location is alerted. If the active location then depresses the corresponding intercom button, the active line is placed on hold and the intercom initiated. When the intercom button from one inactive location is to another inactive location is depressed, whether a third location is active or not, the selected location alerts the user that an intercom is requested. If the user at that location depresses the corresponding intercom button, then the intercom is initiated between the two inactive locations without interfering with the active location.

Figure 6A:
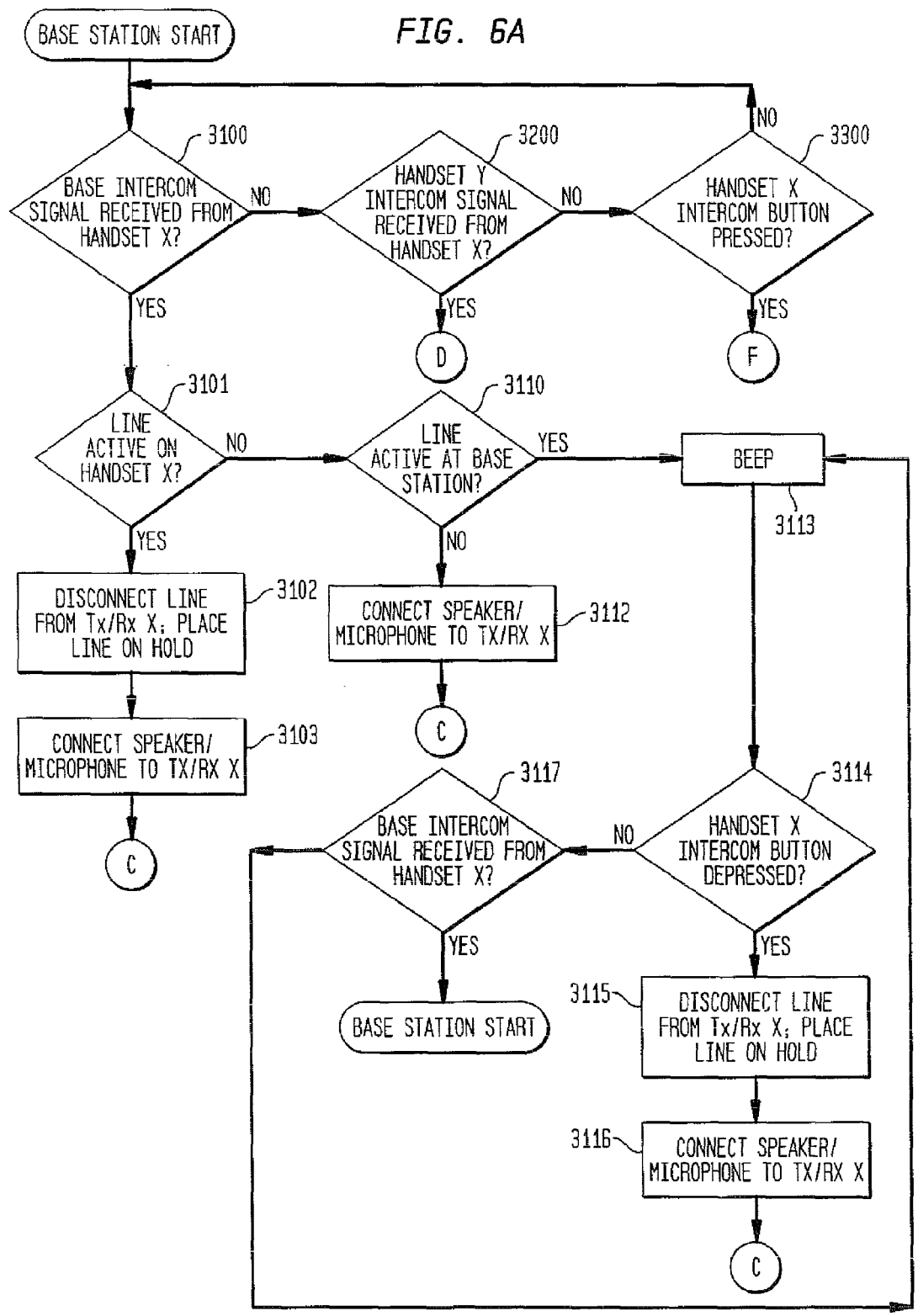
FIG. 6a is a flowchart of the algorithm in the Base station of a multiple handset active call intercom enabled cordless telephone with separate intercoms for each handset.

FIG. 6a, FIG. 6b, and FIG. 6c illustrate the process flow of the base station 3000 of a multiple handset active call enabled cordless telephone with separate intercom buttons for each handset.

If a base station 3000 intercom signal from handset 1 3010 is received by base station 3000, as detected at processing segment 3100, the base station 3000 checks if the telephone line is active on handset 1 3010 at processing segment 3101. If the telephone line is active on handset 1 3010, as detected at processing segment 3101, the microprocessor 3005 disconnects the telephone line from transmitter/receiver circuit 1 3002 at segment 3102, the active line is placed on hold, and the speaker/microphone 3008 is connected to transmitter/receiver circuit 1 3002 at segment 3103, initiating the intercom communication between the base station 3000 and handset 1 3010.

If the telephone line is not active on handset 1 3010, as detected at processing segment 3101, the microprocessor 3005 checks if the telephone line is active at the base station 3000 at processing segment 3110. If the telephone line is not active at the base station 3000, as detected at processing segment 3110, the microprocessor 3005 connects transmitter/receiver circuit 1 3002 to the speaker/microphone 3005 at segment 3112, initiating the intercom communication between the base station 3000 and handset 1 3010.

If the telephone line is active at the base station 3000, as detected at processing segment 3110, the microprocessor 3005 sends a signal to the speaker/microphone 3007 to beep at segment 3113, alerting the base station user that an intercom communication is requested. The microprocessor 3005 then checks if handset 1 intercom button 3004 was depressed at processing segment 3114, indicating that the base station 3000 user wants to initiate the intercom communication. If handset 1 intercom button 3004 was depressed, as detected at processing segment 3114, the microprocessor 3005 disconnects the telephone line from transmitter/receiver circuit 1 3002 at segment 3115, the active line is placed on hold, and connects transmitter/receiver circuit 1 3002 to the speaker/microphone 3007 at segment 3116, initiating the intercom communication between the base station 3000 and handset 1 3010.

If handset 1 3010 intercom button 3004 is not depressed, as detected at processing segment 3114, the microprocessor 3005 checks if the base intercom signal from handset 1 3010 is received by base station 3000 at processing segment 3117, indicating that the handset 1 3010 user no longer wants to initiate an intercom communication, i.e. the handset 1 3010 user pressed the base station 3000 intercom button 3015 a second time before the base station 3000 user pressed the handset 1 3010 intercom button 3004 to initiate the intercom communication. If the base intercom signal from handset 1 3010 was not received by base station 3000, as detected at processing segment 3117, the microprocessor 3005 returns to segment 3113. If the base intercom signal from handset 1 3010 was received by base station 3000, as detected at processing segment 3117, the microprocessor 3005 returns to the start of base station processing.

The same process is followed if a base station 3000 intercom signal from handset 2 3020 is received by base station 3000 at processing segment 3100 with transmitter/receiver circuit 2 3001 in place of transmitter/receiver circuit 1 3002.

After the intercom is initiated between the base station 3000 and handset 1 3010 at segments 3103, 3105, 3112, and 3116, the microprocessor 3005 checks if the speakerphone button 3008 was depressed at processing segment 3120 to determine if the intercom communication should be terminated. If the speakerphone button 3008 was depressed, as detected at processing segment 3120, indicating that the base station 3000 user wants to terminate the intercom communication and activate the line, the microprocessor 3005 disconnects transmitter/receiver circuit 1 3002 from the speaker/microphone 3007 at segment 3121, terminating the intercom communication, connects the telephone line and speaker/microphone 3007 at segment 3122, activating the line, transmits the end of intercom signal to handset 1 3010 at segment 3123, and proceeds the start of base station processing.

If the speakerphone button 3008 is not depressed, as detected at processing segment 3120, the microprocessor 3005 checks if handset 1 intercom button 3004 was depressed at processing segment 3124, indicating that the base station 3000 user wants to terminate the intercom communication. If handset 1 intercom button 3004 was depressed, as detected at processing segment 3124, the microprocessor 3005 disconnects transmitter/receiver circuit 1 3002 from the speaker/microphone 3007 at segment 3125, terminating the intercom communication, transmits the end of intercom signal to handset 1 3010 at segment 3127 and proceeds to the start of base station processing.

If handset 1 intercom button 3004 was not depressed, as detected at processing segment 3124, the microprocessor 3005 checks if the activate line signal was received from handset 1 3010 1 at processing segment 3130, indicating that the handset 1 3010 user wants to terminate the intercom communication and activate the line. If the base station activate line signal was received from handset 1 3010, as detected at processing segment 3130, the microprocessor 3005 disconnects the transmitter/receiver circuit 1 3002 from the speaker/microphone 3007 at segment 3131, terminating the intercom communication, connects the phone line to transmitter/receiver circuit 1 3002 at segment 3132, activating the line, and proceeds to the start of base station processing.

If the activate line signal was not received from handset 1 3010, as detected at processing segment 3130, the microprocessor 3005 checks if the base station 3000 intercom signal from handset 1 3010 was received by base station 3000 at processing segment 3133, indicating that the handset 1 3010 user wants to terminate the intercom communication. If the base station 3000 intercom signal from handset 1 3010 was received by base station 3000, as detected at processing segment 3133, the microprocessor 3005 disconnects the transmitter/receiver circuit 1 3002 from the speaker/microphone 3007 at segment 3134, terminating the intercom communication, and proceeds to the start of base station processing.

If the base station 3000 intercom signal from handset 1 3010 is not received by base station 3000, as detected at processing segment 3133, the microprocessor 3007 proceeds to processing segment 3120 to continue checking if the intercom communication should be terminated.

If the base station 3000 does not receive a base intercom signal from either handset 1 3010 or handset 2 3020, as detected at processing segment 3100, the microprocessor 3007 checks if handset 2 3020 intercom signal from handset 1 3010 is received at processing segment 3200. If handset 2 3020 intercom signal from handset 1 3010 is received, as detected at processing segment 3200, the microprocessor 3005 checks if the telephone line is active on handset 1 3010 at processing segment 3201 as shown in FIG. 6b. If the telephone line is active on handset 1 3010, the microprocessor 3005 sends handset 1 3010 intercom signal to handset 2 3020 at segment 3202, disconnects the telephone line from transmitter/receiver circuit 1 3002 at segment 3203, the active line is placed on hold, and connects transmitter/receiver circuit 1 3002 to transmitter/receiver circuit 2 3001 at segment 3204, initiating the intercom communication between handset 1 3010 and handset 2 3020.

If the telephone line is not active on handset 1 3010, as detected at processing segment 3201, the microprocessor 3005 checks if the telephone line is active at handset 2 3020 at processing segment 3210. If the telephone line is active at handset 2 3020, as detected at processing segment 3210, then the microprocessor 3005 sends handset 1 3010 intercom signal to handset 2 3020 a segment 3211. The processor then checks if handset 1 3010 intercom signal from handset 2 3020 is received at processing segment 3212. If handset 1 3010 signal from handset 2 3020 is received, as detected at 3212, the microprocessor 3005 disconnects transmitter/receiver circuit 2 3001 from the line at segment 3214, the active line is placed on hold, and connects transmitter/receiver circuit 1 3002 and transmitter/receiver circuit 2 3001 at segment 3215, initiating the intercom communication between handset 1 3010 and handset 2 3020.

If handset 1 3010 intercom signal from handset 2 3020 is not received by base station 3000, as detected at processing segment 3212, the microprocessor 3005 checks if handset 2 3020 intercom signal from handset 1 3010 was received. If handset 2 3020 intercom signal from handset 1 3010 was received by base station 3000, then the microprocessor 3005 returns to processing segment 3100. If handset 2 3020 intercom signal from handset 1 3010 was not received by base station 3000, then the microprocessor 3005 returns to processing segment 3212.

If the telephone line is not active at handset 2 3020, as detected at processing segment 3210, then the microprocessor 3005 sends the handset 1 3010 intercom signal to handset 2 3020 at segment 3220. The microprocessor 3005 then checks if the handset 1 3010 intercom signal from handset 2 3020 was received by base station 3000 at processing segment 3221, indicating that the handset 2 3020 user wants to initiate an intercom communication with handset 1 3010. If the handset 1 3010 intercom signal from handset 2 3020 was not received by base station 3000, as detected at processing segment 3221, the microprocessor 3005 checks if the handset 2 3020 intercom signal from handset 1 3010 was received by base station 3000 at processing segment 3226, indicating that the handset 1 3010 user no longer wants to initiate an intercom communication with handset 2 3020. If handset 2 3020 intercom signal from handset 1 3010 was not received by base station 3000, as detected at processing segment 3226, the microprocessor 3005 returns to processing segment 3221. If the handset 2 3020 intercom signal from handset 1 3010 was received by base station 3000, as detected at processing segment 3226, the microprocessor 3005 returns to the start of base station processing.

If handset 1 3010 intercom signal from handset 2 3020 was received by base station 3000, as detected at processing segment 3221, the microprocessor 3005 connects transmitter/receiver circuit 1 3002 to transmitter receiver 2 circuit 2 3001 at segment 3225, initiating the intercom communication.

Once the intercom communication is initiated at segments 3204, 3215, and 3225, the microprocessor 3005 determines if the intercom communication should be terminated. The microprocessor checks if the handset 1 3010 intercom signal from handset 2 3020 was received by base station 3000 at processing segment 3230, indicating that the handset 1 3010 user wants to terminate the intercom communication. If it the handset 1 3010 intercom signal from handset 2 3020 was received by base station 3000, as detected at processing segment 3230, the microprocessor 3005 sends the handset 2 3020 intercom signal to handset 1 3010, disconnects transmitter/receiver circuit 1 3002 from transmitter/receiver circuit 2 3001 at segment 3232, terminating the intercom communication, and returns the start of base station processing.

If the handset 1 3010 intercom signal from handset 2 3020 was not received by base station 3000, as detected at processing segment 3230, the microprocessor 3005 checks if the handset 2 3020 intercom signal from handset 1 3010 was received by base station 3000 at processing segment 3233. If the handset 2 3020 intercom signal from handset 1 3010 was received by base station 3000, as detected at processing segment 3233, the microprocessor 3005 sends the handset 1 3010 intercom signal to handset 2 3020 at segment 3234, disconnects transmitter/receiver circuit 1 3002 from transmitter/receiver circuit 2 3001 at segment 3232, terminating the intercom communication, and proceeds the start of base station processing.

If handset 2 3020 intercom signal from handset 1 3010 was not received by base station 3000, as detected at processing segment 3233, the microprocessor 3005 checks if the activate line signal was received from handset 1 3010 at processing segment 3240. If the activate line signal from handset 1 3010 was received by base station 3000, as detected at processing segment 3240, the microprocessor 3005 sends handset 1 3010 intercom signal to handset 2 3020 at segment 3241, disconnects transmitter/receiver circuit 1 3002 from transmitter/receiver circuit 2 3001 at segment 3242, terminating the intercom communication, connects the telephone line to transmitter/receiver circuit 1 3002 at segment 3243, activating the line on handset 1 3010, and returns to the start of base station processing.

If the activate line signal was not received from handset 1 3010, as detected at processing segment 3240, the microprocessor 3005 checks if the activate line signal was received from handset 2 3020 at processing segment 3244. If the activate line signal was received from handset 2 3020, as detected at processing segment 3244, the microprocessor 3005 disconnects transmitter/receiver circuit 1 3002 from transmitter/receiver circuit 2 3001 at segment 3245, terminating the intercom communication, connects the telephone line to transmitter/receiver circuit 2 3001 at segment 3246, activating the line on handset 2 3020, sends handset 2 3020 intercom signal to handset 1 3010 at segment 3247 and returns to the start of base station processing.

If the activate line signal is not received from handset 2 3020, as detected at processing segment 3244, the microprocessor 3005 returns to processing segment 3230 to continue checking if the intercom communication should be terminated.

If a the handset 2 3020 intercom signal from handset 1 3010 is not received by base station 3000, as detected at processing segment 3200, the base station 3000 checks if the handset 1 3010 intercom button 3004 or handset 2 3020 intercom button 3006 was pressed at processing segment 3300. If the handset 1 3010 intercom button 3004 is pressed at processing segment 3300, the microprocessor 3005 checks if the line is active at the base station 3000 at processing segment 3301. If it the line is active, as detected at processing segment 3301, the microprocessor 3005 disconnects the telephone line from the speaker/microphone 3007 at segment 3302, the active line is placed on hold, sends a base station 3000 intercom signal to handset 1 3010 at segment 3303, and connects the speaker/microphone 3007 to transmitter/receiver circuit 1 3002 at segment 3304 initiating the intercom communication.

If the telephone line is not active at the base station 3000, as detected at processing segment 3301, the microprocessor 3005 checks if the telephone line is active on handset 1 3010 at processing segment 3305. If the line is active at the base station, as detected at processing segment 3305, the microprocessor 3005 sends a base station 3000 intercom signal to handset 1 3010 at segment 3306 and connects the speaker/microphone 3007 to transmitter/receiver circuit 1 3002 at segment 3307, initiating the intercom communication between the base station 3000 and handset 1 3010.

If the telephone line is not active on handset 1 3010, as detected at processing segment 3305, the microprocessor sends the base station 3000 intercom signal to handset 1 3010 at segment 3311 and checks if the base station 3000 intercom signal from handset 1 3010 was received by base station 3000 at processing segment 3312, indicating that the handset 1 3010 user wants to initiate the intercom communication. If the base intercom signal from handset 1 3010 was not received by base station 3000, as detected at processing segment 3312, the microprocessor 3005 checks if the handset 1 3010 intercom button 3004 was pressed at processing segment 3313, indicating that the base station 3000 user no longer wants to initiate the intercom communication. If the handset 1 3010 intercom button was not depressed, as detected at processing segment 3313, the microprocessor 3005 returns to processing segment 3312 to continue the loop until the intercom communication is initiated or the intercom communication is cancelled.

If the base intercom signal from handset 1 3010 is received by base station 3000 at processing segment 3312, the microprocessor 3005 disconnects the telephone line from transmitter/receiver circuit 1 3002 at segment 3314, the active line is placed on hold, and connects the speaker/microphone 3007 to transmitter/receiver circuit 1 3002 at segment 3315, initiating the intercom communication.

After the intercom communication is initiated between the base station 3000 and handset 1 3010 at segments 3304, 3307, and 3315, the microprocessor 3005 determines if the intercom communication should be terminated. The microprocessor 3005 checks if the handset 1 3010 intercom button 3004 was pressed at processing segment 3316. If the handset 1 3010 intercom button 3004 was pressed, as detected at processing segment 3316, the microprocessor 3005 sends the base station 3000 intercom signal to handset 1 3010 at segment 3317, disconnects transmitter/receiver circuit 1 3002 from the speaker/microphone 3007 at segment 3318, terminating the intercom communication, and returns to the start of base station processing.

If the handset 1 3010 intercom button 3004 was not pressed, as detected at processing segment 3316, the microprocessor 3005 checks if the base station 3000 intercom signal from handset 1 3010 was received by base station 3000 at processing segment 3320. If the base station 3000 intercom signal from handset 1 3010 was received by base station 3000, as detected at processing segment 3320, the microprocessor 3005 disconnects transmitter/receiver circuit 1 3002 from speaker/microphone 3007, terminating the intercom communication, and proceeds to the start of base station processing.

If the base station 3000 intercom signal from handset 1 3010 was not received by base station 3000, as detected at processing segment 3320, the microprocessor 3005 checks if the activate line signal was received from handset 1 3010 at processing segment 3321. If the activate line signal was received from handset 1 3010, as detected at processing segment 3321, the microprocessor 3005 disconnects the transmitter/receiver circuit 1 3002 from the speaker/microphone 3007 at segment 3322, terminating the intercom communication, connects the telephone line to transmitter/receiver circuit 1 3002 at segment 3323, activating the line on handset 1 3010, and returns to the start of base station processing.

If the activate line signal was not received from handset 1 3010, as detected at processing segment 3321, the microprocessor 3005 checks if the activate line button 3008 was depressed at processing segment 3330. If the activate line button 3008 was depressed, as detected at processing segment 3330, the microprocessor 3005 sends the base intercom signal to handset 1 3010 at segment 3331, disconnects transmitter/receiver circuit 1 3002 from the speaker/microphone 3007 at segment 3332, terminating the intercom communication, connects the telephone line to the speaker/microphone 3007 at segment 3333, activating the line at the base station 3000, and returns to the start of base station processing.

If the activate line button 3008 was not depressed, as detected at processing segment 3330, the microprocessor 3005 returns to processing segment 3316 to continue the loop until the intercom communication should be terminated.

FIG. 6d and FIG. 6e illustrate the process flow of a handset 3010 3020 for a multiple handset active call enabled cordless telephone with separate intercom buttons for each handset.

When the handset 2 3020 intercom button 3016 is pressed on handset 1 3010, as detected at processing segment 3400, the microprocessor 3013 sends the handset 2 3020 intercom signal to the base station 3000 at segment 3401 and checks if the telephone line is active on handset 1 3010 at processing segment 3402. If the telephone line is inactive on handset 1 3010, the microprocessor 3013 connects transmitter/receiver circuit 3011 to the speaker/microphone 3012 3022 at segment 3403, initiating the intercom communication between handset 1 3010 and handset 2 3020.

If the handset 2 3020 intercom button 3016 is not pressed, as detected at processing segment 3400, the microprocessor 3013 checks if the handset 2 3020 intercom signal from base station 3000 was received by handset 1 3010 at processing segment 3410, indicating that the handset 2 3020 user wants to initiate an intercom communication with handset 1 3010. If the handset 2 3020 intercom signal from base station 3000 was received by handset 1 3010, as detected at processing segment 3410, the microprocessor 3013 sends a signal to the speaker/microphone 3012 to beep at segment 3411 and checks if the handset 2 3020 intercom button 3016 was depressed at processing segment 3412, indicating that the handset 1 3010 user wants to initiate the intercom communication with handset 2 3020. If the handset 2 3020 intercom button 3016 was not depressed, as detected at processing segment 3412, the microprocessor 3013 checks if the handset 2 3010 intercom signal from base station 3000 was received by handset 1 3010 at processing segment 3413, indicating that the handset 2 3020 user no longer wants to initiate an intercom communication.

If the handset 2 3020 intercom signal from base station 3000 was received by handset 1 3010, as detected at processing segment 3413, then the microprocessor 3013 returns to the start of handset 1 processing. If the handset 2 3020 was not received, then the microprocessor 3013 returns to segment 3411.

If the handset 2 3020 intercom button 3016 was depressed, as detected at processing segment 3412, the microprocessor 3013 sends the handset 2 3020 intercom signal at segment 3414 and checks if the telephone line is active on handset 1 3010 at processing segment 3415. If the telephone line is not active on handset 1 3010, as detected at processing segment 3415, the microprocessor 3013 connects transmitter/receiver circuit 3011 to the speaker/microphone 3012 at segment 3416, initiating the intercom communication.

After the intercom communication is initiated between handset 1 3010 and handset 2 3020 at segments 3403, 3416, 3402 and 3415, the microprocessor 3013 determines if the intercom communication should be terminated. The microprocessor 3013 checks if the handset 2 3020 intercom button 3016 was depressed at processing segment 3430, indicating that the handset 1 3010 user wants to terminate the intercom communication. If the handset 2 3020 intercom button 3016 was depressed, as detected a processing segment 3430, the microprocessor 3013 transmits the handset 2 intercom signal to the base station at segment 3431, disconnects the transmitter/receiver circuit 3011 from the speaker/microphone 3012 at segment 3432, terminating the intercom communication, and returns the start of handset 1 processing.

If the handset 2 3020 intercom button 3016 is not depressed, as detected at processing segment 3430, the microprocessor 3013 checks if the handset 2 3020 intercom signal was received from base station 3000 by handset 3000 at processing segment 3433. If the handset 2 3020 intercom signal from base station 3000 was received by handset 3010, as detected at processing segment 3433, the microprocessor 3013 disconnects transmitter/receiver circuit 3011 from the speaker/microphone 3012 at segment 3434, terminating the intercom communication, and returns to the start of handset 1 processing. If the handset 2 3020 intercom signal from base station 3000 was not received by handset 1 3010 at processing segment 3433, the microprocessor 3013 returns to processing segment 3430 to continue the loop until the intercom communication between handset 1 3010 and handset 2 3020 should be terminated.

If the handset 2 intercom signal from base station 3010 is not received by handset 1 3010, as detected at processing segment 3410, the microprocessor 3013 checks if the base station 3000 intercom button 3015 was depressed at processing segment 3420, indicating that the handset 1 3010 user wants to initiate an intercom communication with the base station 3000. If the base station 3000 intercom button 3015 was depressed, as detected at processing segment 3420, the microprocessor 3013 sends the base station 3000 intercom signal at segment 3421 and checks if the telephone line is active on handset 1 3010 at processing segment 3422. If the telephone line is not active at handset 1 3010, as detected at processing segment 3422, the microprocessor 3013 connects the transmitter/receiver circuit 3011 to the speaker/microphone 3012 at segment 3423, initiating the intercom communication.

If the base station intercom button 3015 was not depressed, as detected at processing segment 3420, the microprocessor 3013 checks if the base station 3000 intercom signal from base station 3000 was received by handset 1 3010 at processing segment 3500, indicating that the base station 3000 user wants to initiate an intercom communication with handset 1 3010. If the base station 3000 intercom signal from base station 3000 was not received by handset 1 3010, as detected at processing segment 3500, the microprocessor 3013 returns to the start of handset 1 processing.

If the base station 3000 intercom signal from base station 3000 was received by handset 3010, as detected at processing segment 3500, the microprocessor 3013 sends a signal to the speaker/microphone 3012 to beep and checks if the base station 3000 intercom button 3015 was depressed at processing segment 3502. If the base station 3000 intercom button 3015 was not depressed, as detected at processing segment 3502, the microprocessor 3013 checks if the base station intercom signal from base station 3000 was received by handset 3010 at processing segment 3506, indicating that the base station 3000 user no longer wants to initiate an intercom communication. If the base station 3000 intercom signal from base station 3000 was not received by handset 3010, as detected at processing segment 3506, the microprocessor 3013 returns to segment 3501 to continue the loop until the base station 3000 user cancels the request to initiate an intercom communication or the handset 1 3010 user initiates the intercom communication. If the base station 3000 intercom signal from base station 3000 was received by handset 3010, as detected at processing segment 3506, indicating that the base station 3000 user no longer wants to initiate an intercom communication, the microprocessor 3013 returns to the start of handset 1 processing.

If the base station 3000 intercom button 3015 was depressed, as detected at processing segment 3502, the microprocessor 3013 transmits the base station intercom signal to the base station 3000 at segment 3503 and check if the telephone line is active on handset 1 3010 at processing segment 3504. If the telephone line is not active, as detected at processing segment 3504, the microprocessor 3013 connects the transmitter/receiver circuit 3011 to the speaker/microphone 3012 at segment 3505, initiating the intercom communication.

After the intercom communication is initiated at segments 3423, 3505, 3422 and 3504, the microprocessor 3013 determines if the intercom communication between the base station 3000 and handset 1 3010 should be terminated. The microprocessor 3013 checks if the base station 3000 intercom button 3015 was depressed at processing segment 3510, indicating that the handset 1 3010 user wants to terminate the intercom communication. If the base station 3000 intercom button 3015 was depressed, as detected at processing segment 3510, the microprocessor 3013 transmits the base station 3000 intercom signal to the base station 3000 at segment 3511, disconnects the transmitter/receiver circuit 3011 from the speaker/microphone 3012 at segment 3512, terminating the intercom communication and returns the start of handset 1 processing.

If the base station 3000 intercom button 3015 was not depressed, as detected as processing segment 3510, the microprocessor 3013 checks if the base station 3000 intercom signal from base station 3000 was received by handset 3010 at processing segment 3513. If the base station 3000 intercom signal from base station 3000 was not received by handset 3010, as detected at processing segment 3513, the microprocessor 3013 returns to processing segment 3510 to continue the loop until the intercom communication between the base station 3000 and handset 1 3010 should be terminated.

If the base station 3000 intercom communication was received, as detected at processing segment 3513, the microprocessor 3013 disconnects transmitter/receiver circuit 3011 from the speaker/microphone 3012 at segment 3514, terminating the intercom communication, and returns the start of handset 1 processing.

Accordingly, no matter which of the base station 3000, handset 1 3010, or handset 2 3020 initiates an intercom communication during an active call, the active call is placed on hold during the intercom communication and is resumed when the intercom communication is over.

While the above embodiments of the present invention is described using a microprocessor as a control circuit for the base station and the handsets, the functions of each can be achieved using other control circuits which may be implemented as an ASIC or other digital or analog control circuit.

While various specific embodiments of the invention have been described and illustrated, these are only exemplary of the invention and many modifications and substitutions can be made without departing from the spirit or scope of the invention. Accordingly, the invention is not limited by the foregoing description, but is only limited by the scope of the appended claims.

What is claimed is:

1. A method of communicating between wireless handsets in a multi-device telephone system, wherein:
   the system comprises a base station and at least two wireless handsets; and
   the system is adapted to permit voice communication (i) between at least two of the wireless handsets and (ii) between at least one of the wireless handsets and an external telephone via a telephone network,
   the method comprising:
   (a) making a first connection for voice communication between a first wireless handset and the external telephone;
   (b) placing the first connection on hold while attempting to make a second connection for voice communication between the first wireless handset and a second wireless handset of the system;
   (c) making the second connection;
   (d) breaking the first and second connections; and
   (e) making a third connection between the external telephone and the second wireless handset.

2. The invention of claim 1, further comprising providing an audible signal to at least one of the wireless handsets to indicate that the second connection is made.

3. A multi-device telephone system comprising:
   a base station and at least two wireless handsets; wherein the system is adapted to:
   (a) permit voice communication (i) between any two of the wireless handsets and (ii) between one of the wireless handsets and an external telephone via a telephone network;
   (b) make a first connection for voice communication between a first wireless handset of the system and the external telephone;
   (c) place the first connection on hold while attempting to make a second connection for voice communication between the first wireless handset and a second wireless handset of the system;
   (d) make the second connection;
   (e) break the first and second connections; and
   (f) make a third connection between the external telephone and the second wireless handset.

4. The invention of claim 3, wherein the system is further adapted to provide an audible signal to at least one of the wireless handsets to indicate that the second connection is made.

5. A base station for a multi-device telephone system comprising the base station and at least two wireless handsets, the base station comprising control circuitry adapted to:
   (a) make a first connection for voice communication between a first wireless handset of the system and an external telephone via a telephone network;
   (b) place the first connection on hold while attempting to make a second connection for voice communication between the first wireless handset and a second wireless handset of the system;
   (c) make the second connection;
   (d) break the first and second connections; and
   (e) make a third connection between the external telephone and the second wireless handset.

6. The invention of claim 5, wherein the control circuitry is further adapted to provide an audible signal to at least one of the wireless handsets indicate that the second connection is attempted or is made.

* * * * *